US008433991B2

(12) United States Patent
Raman

(10) Patent No.: US 8,433,991 B2
(45) Date of Patent: Apr. 30, 2013

(54) GLOBAL NAVIGATION SATELLITE SYSTEM (GLONASS) DATA BIT EDGE DETECTION

(75) Inventor: Sundar Raman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 405 days.

(21) Appl. No.: 12/817,017

(22) Filed: Jun. 16, 2010

(65) Prior Publication Data

US 2011/0314360 A1 Dec. 22, 2011

(51) Int. Cl.
*H04L 7/0338* (2006.01)
(52) U.S. Cl.
USPC .......................................................... 714/819
(58) Field of Classification Search .............. 714/799, 714/819
See application file for complete search history.

(56) References Cited

U.S. PATENT DOCUMENTS

| | | | |
|---|---|---|---|
| 4,302,845 A | 11/1981 | McClaughry et al. | |
| 4,860,321 A | 8/1989 | Von Der Embse | |
| 4,862,482 A | 8/1989 | Patchen | |
| 4,872,170 A * | 10/1989 | Fujita | 714/746 |
| 4,881,059 A | 11/1989 | Saltzberg | |
| 5,170,396 A * | 12/1992 | Rivers et al. | 714/709 |
| 5,295,162 A | 3/1994 | Zarembowitch | |
| 5,296,820 A | 3/1994 | Kawabata | |
| 5,491,713 A | 2/1996 | Kwok et al. | |
| 5,517,530 A | 5/1996 | Gardner | |
| 5,526,357 A * | 6/1996 | Jandrell | 370/346 |
| 5,553,098 A | 9/1996 | Cochran et al. | |
| 5,778,031 A | 7/1998 | Hiramatsu | |
| 5,790,610 A * | 8/1998 | Julyan | 375/361 |
| 5,815,515 A * | 9/1998 | Dabiri | 714/795 |
| 5,928,293 A | 7/1999 | Jobling et al. | |
| 6,088,829 A * | 7/2000 | Umemura et al. | 714/798 |
| 6,121,926 A | 9/2000 | Belcher et al. | |

(Continued)

FOREIGN PATENT DOCUMENTS

| | | |
|---|---|---|
| EP | 0453063 A2 | 10/1991 |
| JP | 5183593 A | 7/1993 |

(Continued)

OTHER PUBLICATIONS

Sunil Bhanot., "Implementation and Optimization of a Global Navigation Satellite System Software Radio," Ohio University, Nov. 1998, pp. 1-98. Website: http://www.ohiolink.edu/etd/send-pdf.cgi/Bhanot%20Sunil.pdf?acc_num=ohiou1176840392.

(Continued)

*Primary Examiner* — James C Kerveros
(74) *Attorney, Agent, or Firm* — Arnold J. Gum

(57) ABSTRACT

An apparatus and method for detecting data bit edge in a meander encoded information bit from a GLONASS (Global Navigation Satellite System). The method includes receiving meander encoded data samples from a meander encoded information bit, and computing a set of accumulated values corresponding to a hypothesized bit edge phase. The process of computing an accumulated value of the set of accumulated values includes providing a toggled subset of the meander encoded data samples, and integrating the toggled subset of the meander encoded data samples with an un-toggled subset of the meander encoded data samples to produce the accumulated value. The method also includes selecting a best hypothesis from the set of hypotheses corresponding to a maximum value of the set of accumulated values, where the best hypothesis represents the data bit edge.

35 Claims, 13 Drawing Sheets

U.S. PATENT DOCUMENTS

| | | | |
|---|---|---|---|
| 6,195,400 B1 | 2/2001 | Maeda | |
| 6,211,815 B1 | 4/2001 | Richey et al. | |
| 6,297,691 B1 | 10/2001 | Anderson et al. | |
| 6,515,981 B1 | 2/2003 | Schilling et al. | |
| 6,567,484 B1 | 5/2003 | Hirota et al. | |
| 6,757,863 B2 * | 6/2004 | Kaneshige et al. | 714/775 |
| 6,977,973 B1 * | 12/2005 | Wiggins | 375/333 |
| 7,073,118 B2 * | 7/2006 | Greenberg et al. | 714/796 |
| 7,174,502 B2 * | 2/2007 | Miyamoto | 714/798 |
| 7,254,201 B2 | 8/2007 | Kim | |
| 7,266,144 B1 | 9/2007 | Sanders | |
| 7,289,589 B2 | 10/2007 | Pawlowski et al. | |
| 7,359,460 B2 | 4/2008 | Schmidt et al. | |
| 7,409,628 B2 * | 8/2008 | Tran et al. | 714/780 |
| 7,469,023 B2 | 12/2008 | Vasana | |
| 7,522,100 B2 | 4/2009 | Yang et al. | |
| 7,533,326 B2 * | 5/2009 | Chambers | 714/780 |
| 7,587,659 B2 * | 9/2009 | Tran et al. | 714/794 |
| 7,673,226 B2 * | 3/2010 | Eroz et al. | 714/801 |
| 7,702,040 B1 | 4/2010 | Yuan et al. | |
| 7,760,880 B2 * | 7/2010 | Dave et al. | 380/240 |
| 7,840,887 B2 * | 11/2010 | Pietri et al. | 714/811 |
| 8,064,351 B2 * | 11/2011 | Reid et al. | 370/242 |
| 2003/0151547 A1 | 8/2003 | Mauro et al. | |
| 2003/0201935 A1 | 10/2003 | King et al. | |
| 2005/0012664 A1 | 1/2005 | Gerein | |
| 2005/0094756 A1 | 5/2005 | Bertram | |
| 2005/0254415 A1 | 11/2005 | Hara | |
| 2006/0222058 A1 | 10/2006 | Simic et al. | |
| 2006/0267695 A1 | 11/2006 | Keating | |
| 2007/0044006 A1 | 2/2007 | Yang et al. | |
| 2007/0046534 A1 | 3/2007 | Ziedan et al. | |
| 2007/0076788 A1 | 4/2007 | Jia et al. | |
| 2007/0147483 A1 | 6/2007 | Tang | |
| 2007/0168777 A1 | 7/2007 | Regev et al. | |
| 2007/0205940 A1 | 9/2007 | Yang et al. | |
| 2007/0248152 A1 | 10/2007 | Wang et al. | |
| 2009/0054075 A1 | 2/2009 | Boejer et al. | |
| 2009/0135664 A1 | 5/2009 | Demone | |
| 2009/0135674 A1 | 5/2009 | Matsuzaki | |
| 2010/0134349 A1 | 6/2010 | Lennen et al. | |
| 2012/0007777 A1 | 1/2012 | Hammes et al. | |
| 2012/0050096 A1 | 3/2012 | Cheng et al. | |
| 2012/0051402 A1 | 3/2012 | Cheng et al. | |
| 2012/0093208 A1 | 4/2012 | Wu et al. | |

FOREIGN PATENT DOCUMENTS

| | | |
|---|---|---|
| RU | 2341898 C2 | 12/2008 |
| WO | 9513677 A1 | 5/1995 |
| WO | 9525401 A1 | 9/1995 |
| WO | 9818202 A1 | 4/1998 |
| WO | 03067279 | 8/2003 |
| WO | 2005048521 | 5/2005 |
| WO | 2007054406 A1 | 5/2007 |
| WO | 2008005589 A1 | 1/2008 |

OTHER PUBLICATIONS

International Search Report and Written Opinion—PCT/US2011/040778—ISA/EPO—Feb. 14, 2012.

Nik et al., "Implementation of a Dual-Frequency GLONASS and GPS L1 C/A Software Receiver", The Journal of Navigation (2010), 63, pp. 269-287.

Schmid, et al.: "Combined Galileo/GPS Architecture for Enhanced Sensitivity Reception," AEU International Journal of Electronics and Communications, Elsevier, Jena, DE, vol. 59, No. 5, Jul. 15, 2005, pp. 297-306.

* cited by examiner

GLOBAL NAVIGATION SATELLITE SYSTEM (GLONASS) DATA BIT EDGE DETECTION

FIELD

This disclosure relates generally to edge detection of a received signal, and more particularly to data bit edge detection of meander encoded data samples, for example, from GLONASS (Global Navigation Satellite System).

BACKGROUND

Wireless mobile terminals utilized in mobile communication systems are increasingly integrated with other electronic devices to expand their functionality and provide a greater range of services to the user. One such electronic device is a geographic position estimator, and in particular, a device that derives position estimates from receiving and decoding signals broadcasted by navigation satellites. An example of a navigation satellite system is GLONASS (Global Navigation Satellite System) developed by the former Soviet Union. This navigation satellite system is similar to the United States Global Positioning System (GPS), the Chinese Compass Navigation System, and the European Union (EU) Galileo Positioning System. Each of these navigation satellite systems broadcasts encoded signals, which may be received at a receiver, such as a geographic position estimator, and may be processed using trilateration, which calculates the receiver's position on the surface of the Earth.

To acquire and process a satellite signal requires a receiver to determine data bit boundaries of an incoming stream of data samples. Often a window spanning a single information data bit contains several data samples. Herein, a data sample represents an integration across a PN code period. For example, one data sample represents an integration across a period containing a single 1023-chip PN code. In such cases, the receiving device must determine a starting sample for the window. For example, a window spanning the time of 20 data samples has the possibility of starting at any one of 20 different phases. For meander encoded data samples, a transition rate is effectively doubled by the encoding process, which induces a transition at the center of the data bit (e.g., an information data bit stream has possible transitions at a rate of 50 Hz, whereas a meander encoded data bit stream has possible transitions at a rate of 100 Hz). A meander code is also referred to as a Manchester code.

Conventionally for meander encoded information data bits, a two-step process is used to determine a data bit boundary (also referred to as a data bit edge). Prior to this two-step test, the sub-PN code resolution has been determined. That is, the starting point of each repeated PN code has been determined. In a GLONASS system, the PN code repeats every millisecond; therefore, the system has knowledge of the sub-millisecond offset. Thus in GLONASS, the two-step process uses the predetermined 1-ms timing to determine the 10 and 20 ms boundaries. In the first step, initial boundaries at the meander encoded transition rate are determined. The initial boundaries are at a rate twice the rate of the information data bits (i.e., at the meander rate). The initial boundaries both (1) separate neighboring data bits and (2) divide each meander encoded data bit in half. In the second step, the initial boundaries are analyzed to distinguish (1) data bit boundaries separating neighboring data bits from (2) meander encoded center transitions that divide each bit in half. As an example, a window spanning 20 meander encoded data samples at a rate of 1 sample/ms has 20 corresponding possible starting points. First, an initial boundary starting point (or phase) is determined with a 10-ms spacing (100-Hz data rate), then second, a data bit boundary starting point (data bit edge) is determined with a 20-ms spacing (50 Hz data rate). Once the receiving device determines a starting point, the device may remove the meander code and interpret the received data samples.

This two-step process has multiple disadvantages and drawbacks. First, when the initial boundary is determined, it may be erroneously set. This guarantees that the second step will also determine an erroneous data bit edge. Additional, the two-step process must complete the first step before beginning the second step. Therefore, an improved method and device for data bit edge detection of meander encoded data samples, for example, from a GLONASS satellite, is desirable.

SUMMARY OF THE DISCLOSURE

Disclosed are apparatus and methods for detecting a data bit edge in meander encoded information bit stream, such as from GLONASS (Global Navigation Satellite System) or another system using meander encoding.

According to some aspects, disclosed is a method for detecting a bit edge from a stream of meander encoded data samples, for example, from a GLONASS satellite. The method comprises: (1) receiving meander encoded data samples; (2) computing a set of accumulated values for a corresponding set of hypotheses, each of the hypotheses corresponding to a hypothesized bit edge phase, wherein computing each accumulated value of the set of accumulated values comprises: (2a) providing a toggled subset of the meander encoded data samples; and (2b) integrating the toggled subset of the meander encoded data samples with an un-toggled subset of the meander encoded data samples to produce the accumulated value; and (3) selecting a best hypothesis from the set of hypotheses corresponding to a maximum value of the set of accumulated values, wherein the best hypothesis represents the data bit edge.

According to other aspects, disclosed is a mobile station for detecting a bit edge from a stream of meander encoded data samples. The mobile station includes: (1) a means for receiving meander encoded data samples; (2) a means for computing a set of accumulated values for a corresponding set of hypotheses, each of the hypotheses corresponding to a hypothesized bit edge phase, wherein computing each accumulated value of the set of accumulated values comprises: (2a) a means for providing a toggled subset of the meander encoded data samples; and (2b) a means for integrating the toggled subset of the meander encoded data samples with an un-toggled subset of the meander encoded data samples to produce the accumulated value; and (3) a means for selecting a best hypothesis from the set of hypotheses corresponding to a maximum value of the set of accumulated values, wherein the best hypothesis represents the data bit edge.

According to other aspects, disclosed is a mobile station for detecting a bit edge from a stream of meander encoded data samples, the mobile station comprising: (1) a memory configured to receive meander encoded data samples, wherein each of a plurality of hypothesis corresponds to a hypothesized bit edge phase; (2) a toggle unit coupled to the memory, wherein the toggle unit toggles a subset of the meander encoded data samples; (3) an integrator coupled to the memory and the toggle unit, the integrator configured to integrate the toggled subset of the meander encoded data samples with an un-toggled subset of the meander encoded data samples to produce an accumulated value corresponding to a hypothesis; (4) an accumulating memory coupled to the integrator, the accumulator configured to compute a set of accumulated values for a corresponding set of hypotheses; and (5) a maximum value detector coupled to the accumulating memory, the maximum value detector configured to select a best hypothesis from the sets of hypotheses, the best hypothesis corresponding to a maximum value of set of accumulated values, wherein the best hypothesis represents the data bit edge.

According to other aspects, disclosed is a mobile station for detecting a bit edge from a stream of meander encoded data samples, the mobile station comprising: (1) a first memory and a second memory configured to receive meander encoded data samples, wherein hypotheses are defined from the meander encoded data samples and each of the hypotheses corresponds to a hypothesized bit edge phase; (2) a toggle unit disposed between the first memory and the second memory, wherein the toggle unit toggles a subset of the meander encoded data samples; (3) an integrator coupled to the first memory and the second memory, the integrator configured to integrate the toggled subset of the meander encoded data samples with an un-toggled subset of the meander encoded data samples to produce an accumulated value corresponding to a hypothesis; (4) an accumulating memory coupled to the integrator, the accumulator configured to compute a set of accumulated values for a corresponding set of hypotheses; and (5) a maximum value detector coupled to the accumulating memory, the maximum value detector configured to select a best hypothesis from the sets of hypotheses, the best hypothesis corresponding to a maximum value of set of accumulated values, wherein the best hypothesis represents the data bit edge.

According to other aspects, disclosed is a mobile station for detecting a bit edge from a stream of meander encoded data samples, the mobile station comprising: (1) a first memory and a second memory configured to receive meander encoded data samples, wherein hypotheses are defined from the meander encoded data samples and each of the hypotheses corresponds to a hypothesized bit edge phase; (2) a toggle unit disposed anteriorly to the second memory, wherein the toggle unit toggles a subset of the meander encoded data samples; (3) an integrator coupled to the first memory and the second memory, the integrator configured to integrate the toggled subset of the meander encoded data samples with an un-toggled subset of the meander encoded data samples to produce an accumulated value corresponding to a hypothesis; (4) an accumulating memory coupled to the integrator, the accumulator configured to compute a set of accumulated values for a corresponding set of hypotheses; and (5) a maximum value detector coupled to the accumulating memory, the maximum value detector configured to select a best hypothesis from the sets of hypotheses, the best hypothesis corresponding to a maximum value of set of accumulated values, wherein the best hypothesis represents the data bit edge.

According to other aspects, disclosed is a device for detecting a bit edge from a stream of meander encoded data samples, the device comprising a processing unit and a memory wherein the memory includes software instructions executable by the processing unit to: (1) receive meander encoded data samples; (2) compute a set of accumulated values for a corresponding set of hypotheses, each of the hypotheses corresponding to a hypothesized bit edge phase, wherein the software instruction to compute each accumulated value of the set of accumulated values comprises software instructions to: (2a) provide a toggled subset of the meander encoded data sample; and (2b) integrate the toggled subset of the meander encoded data samples with an un-toggled subset of the meander encoded data samples to produce the accumulated value; and (3) select a best hypothesis from the set of hypotheses corresponding to a maximum value of the set of accumulated values, wherein the best hypothesis represent the data bit edge.

According to other aspects, disclosed is a computer-readable medium including program code stored thereon, the program code executable by a processing unit for detecting a bit edge from a stream of meander encoded data samples and comprising program code to: (1) receive meander encoded data samples; (2) compute a set of accumulated values for a corresponding set of hypotheses, each of the hypotheses corresponding to a hypothesized bit edge phase, wherein the program code to compute each accumulated value of the set of accumulated values comprises program code to: (2a) provide a toggled subset of the meander encoded data sample; and (2b) integrate the toggled subset of the meander encoded data samples with an un-toggled subset of the meander encoded data samples to produce the accumulated value; and (3) select a best hypothesis from the set of hypotheses corresponding to a maximum value of the set of accumulated values, wherein the best hypothesis represents the data bit edge.

It is understood that other aspects will become readily apparent to those skilled in the art from the following detailed description, wherein various aspects are shown and described. The drawings and detailed description are to be regarded as illustrative in nature and not as restrictive.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

Figure 1A:
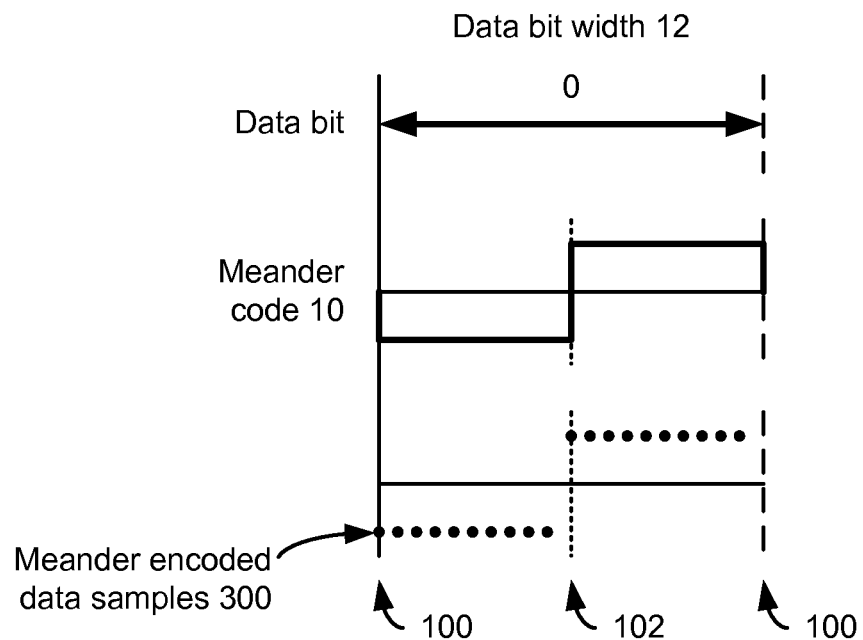
FIGS. 1A and 1B illustrate information data bits encoded with a meander code to form meander encoded data samples.
Figure 1B:
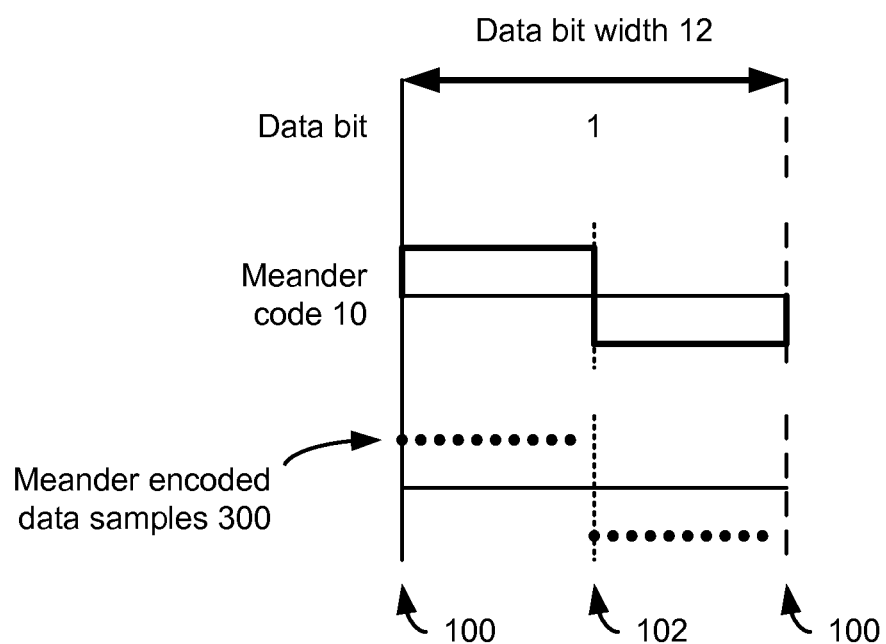

FIGS. 1A and 1B illustrate information data bits encoded with a meander code to form meander encoded data samples. The information data bit is a binary value of either '0' or '1'.

In FIG. 1A, a data bit with value '0' is shown along with a corresponding meander code 10. The meander code is low for the first half and high for the second half. The data bit and resulting meander encoded data bit 10 both have a span shown as data bit width 12. In a GLONASS system, the data bit width 12 is 20 milliseconds (ms). The meander code 10 is remotely transmitted and then locally received. Once received, the signal is sampled as a set of meander encoded data samples 300. The meander encoded data samples 300 define a data bit edge 100 at each end of the data bit and a center bit transition 102. The center bit transition 102 is located at the mid-point between data bit edges 100.

In the example shown, twenty meander encoded data samples 300 fall within the data bit width 12. For illustrative purposes, the meander encoded data samples 300 are shown without noise, which would otherwise distort the data bit samples 300. For instance, in actual meander encoded data bit samples 300, the data samples may not have a common amplitude (be horizontally aligned) with other data samples. As shown, the first 10 samples have a common first value and the second 10 samples have a common complementary value. For example, the first 10 samples may each have a value of "+1" and the second 10 samples may each have a value of "−1", which represent the '0' data bit. The amplitude of the data samples 300 may have passed through a discriminator such that the values are discrete binary (e.g., {0 & 1} or {−1 & −1}). Alternatively, the values may be any of several discrete values within a range (e.g., [0.0, 0.1, 0.2, . . . , 1.0] or [−1.0, −0.9, . . . , +1.0]). For descriptive purposes, the following discussion uses samples that have a binary values of either {−1} or {+1}.

In FIG. 1B, a data bit with value '1' is shown along with a corresponding meander code 10. The meander code is high for the first half and low for the second half. The data bit and resulting meander encoded data bit 10 both have a span shown as data bit width 12 and define a data bit edge 100 at each end of the data bit and a center bit transition 102 at the center of the span. Again, the meander encoded data samples 300 are shown as twenty noiseless samples (10 high samples followed by 10 low samples) to represent the '1' data bit.

FIG. 1A and FIG. 1B each illustrates a data bit encoded as a set of meander encoded data samples 300 over one data bit width 12. Since the illustrations indicate the beginning and ending of a data bit, it is relatively simple to visually determine the data bit edges 100 and center bit transition 102 of the meander encoded data samples 300. The data bit edges 100 are less recognizable without a timing reference when considering a longer stream of data samples.

Figure 2:
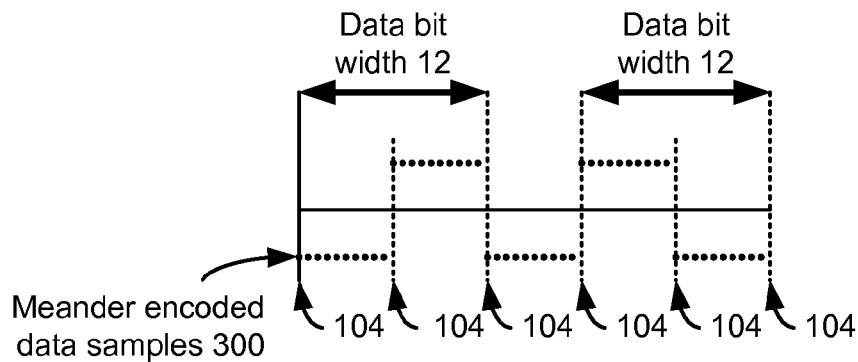
FIGS. 2, 3A and 3B illustrate a long stream of meander encoded data samples and possible corresponding data bit streams.
Figure 3A:
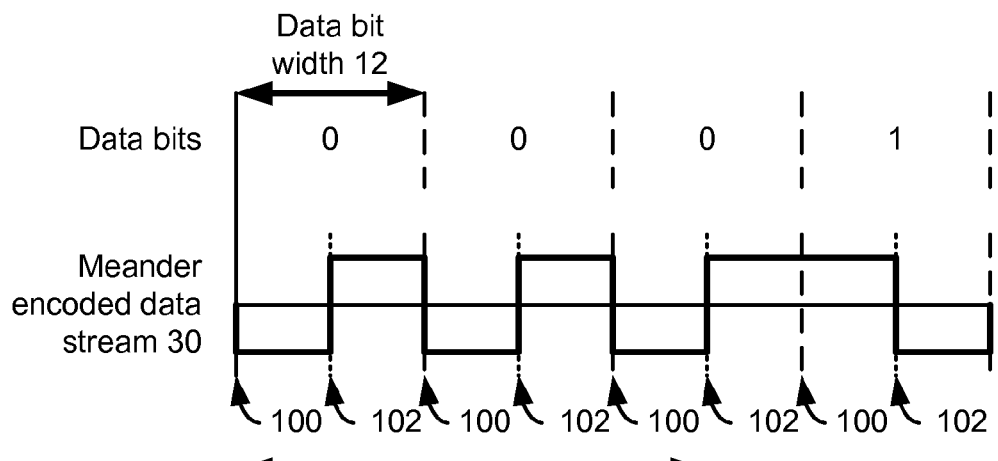
Figure 3B:
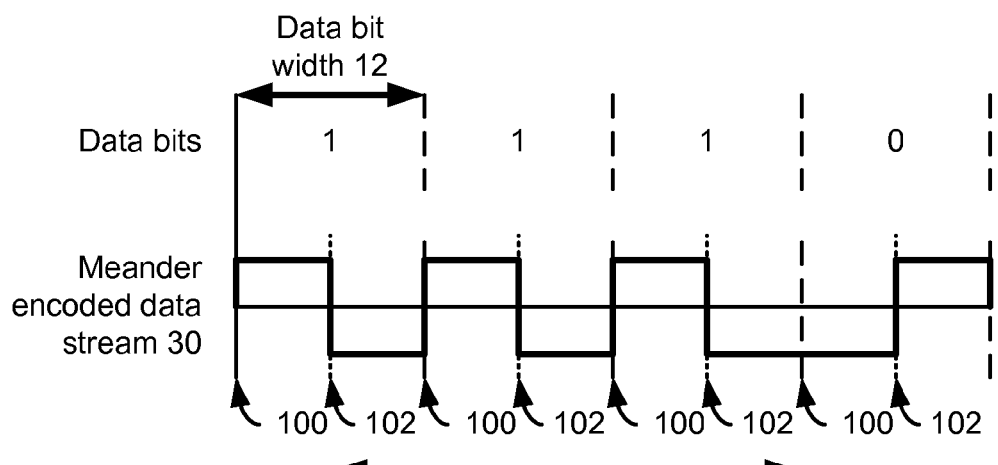

FIGS. 2, 3A and 3B illustrate a long stream of meander encoded data samples and possible corresponding data bit streams. FIG. 2 shows a stream of 50 meander encoded data samples 300 where ten low samples are followed by a transition 104 to ten high samples, which are followed by transitions 104 to ten more low samples, ten high samples and a final ten low samples. Each group of 10 data samples having a common potential is separated by a transition 104. In all, the 50 data samples 300 represent 2½ data bits but the data bit edges 100 are ambiguously positioned at alternating transitions 104. As may be visually recognized, it is not clear where a data bit begins and ends. In this example, it is not possible to know which one of the transitions 104 is a data bit edge 100 and which one of the transitions 104 is a center bit transition 102 without additional information. Specifically, there is no phase reference to indicate the starting point or endpoint of a data bit.

FIG. 3A illustrates four data bits and associated meander encoded data bits 30. The graph shows a data bit '0' represented by a signal beginning at a bit edge 100 starting with a low signal, transitioning to a high signal at a center bit transition 102, and terminating with another bit edge 100. Second data bit '0' and third data bit '0' are similarly represented by transitions at each data bit edge 100 and center bit transition 102 until a first data bit '1' is reached. At the bit edge 102 for the first data bit '1' no transition occurs. The signal continues with the previous high signal transitioning to a low signal at the next center bit transition 102. The lack of a transition of the signal between a data bit '0' followed by the data bit '1' provides a phase reference to determine the beginning and endpoint of each data bit. Based on this lack of a transition, the phase of the data stream 30 may be identified, and the data bit edges 100 and center bit transition 102 may be determined.

FIG. 3B illustrates another four data bits and associated meander encoded data bits 30. The graph shows a sequence of data bits "111" represented by a signal beginning at a bit edge 100 starting with a high signal, transitioning to a low signal at a center bit transition 102, and repeating two more times. A final data bit '0' follows the first three data bits. For the final data bit '0', the signal continues with the previous low signal transitioning to a high signal at the next center bit transition 102. The lack of a transition of the signal between the third data bit '1' and the data bit '0' provides a phase reference to determine the beginning and endpoint of each data bit.

Figure 4:
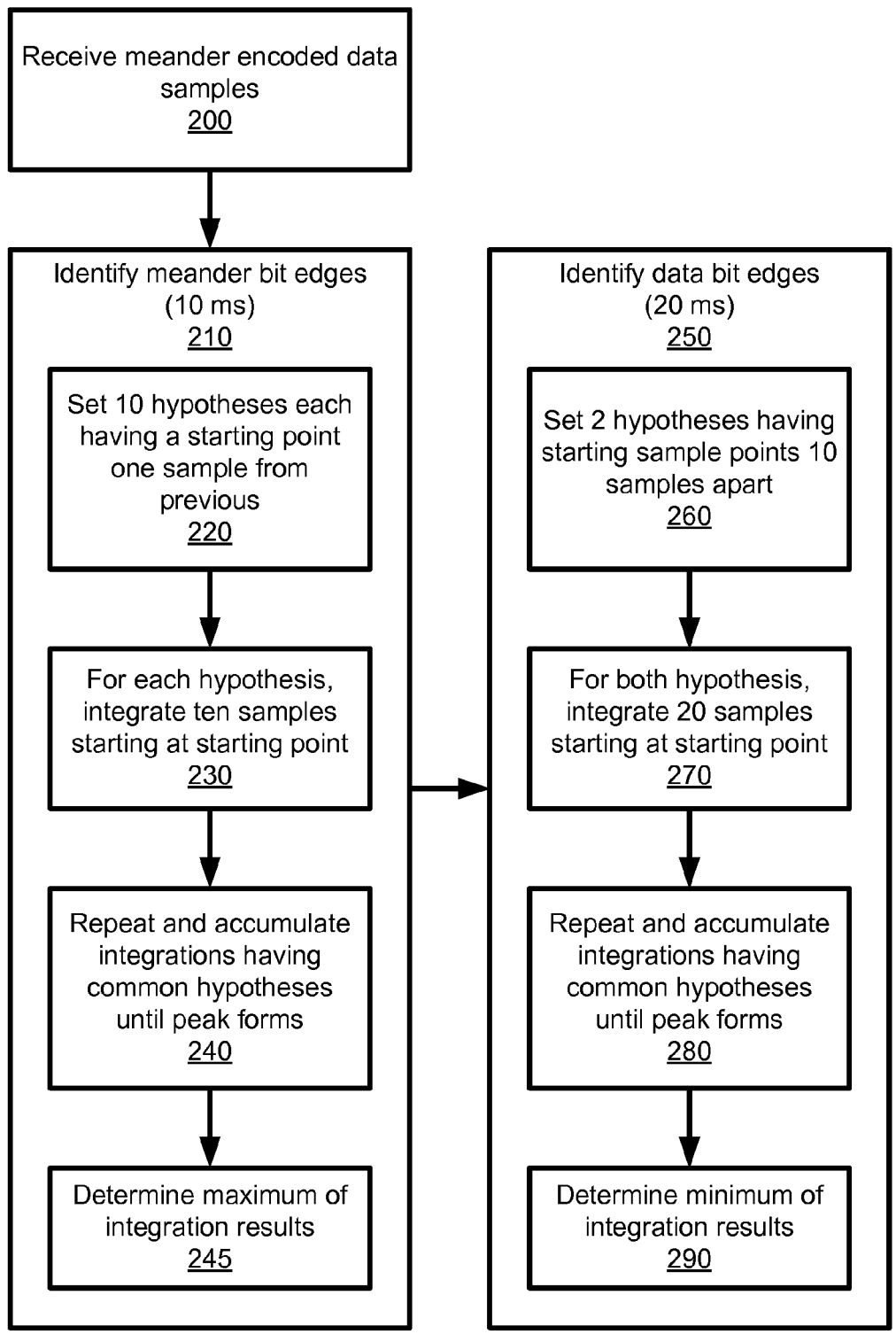
FIG. 4 illustrates a flowchart of a conventional method of detecting data bit edges in meander encoded data samples.

FIG. 4 illustrates a flowchart of a conventional method of detecting data bit edges in meander encoded data samples. This example assumes that 20 samples are taking per data bit at a rate of 1 sample/ms (1 kHz). This two-step process involves identifying transitions 104 at 10-milliseconds transitions points then identifying bit edges 100 at 20-milliseconds points.

The process begins at 200 where a mobile station receives a meander encoded data samples. At 210 (including 220-245), the first step of the process involves identifying meander bit edge transitions 104 spaced at 10-ms steps. At 220, ten hypotheses are set, one for each possible phase of the 10-ms transitions 104. For example, a first hypothesis $H_1$ identifies a possible starting sample as sample k. The second hypothesis $H_2$ identifies a possible starting sample as sample k+1. Additional hypotheses are formed through a final hypothesis $H_{10}$, which identifies a possible starting sample as sample k+9.

At 230, for each hypothesis, ten data samples are integrated starting at the starting point of the hypothesis. For example, for the first hypothesis $H_1$, samples k, k+1, . . . k+9 are integrated together. For the second hypothesis $H_2$, samples k+1, k+2, . . . k+10 are integrated together. The process continues until the tenth hypothesis $H_{10}$, where samples k+9, k+10, . . . k+18 are integrated together.

At 240, steps 220 and 230 are repeated. The integration results for integrations having common hypotheses are accumulate until a peak forms. That is, a first integration result for $H_1$ {samples k through k+9} is added to a second integration result for $H_1$ {samples k+10 through k+19}, which is added to a third integration result for $H_1$ {samples k+20 through k+29}. Similarly, a first integration result for $H_2$ {samples k+1 through k+10} is added to a second integration result for $H_2$ {samples k+11 through k+20}, which is added to a third integration result for $H_2$ {samples k+21 through k+30}. At 245, step 240 is concluded when a maximum of the accumulated integration results is determined.

At 250, (including 260-290), the second step of the process involves identifying meander data bit edges at 20-ms steps. At 260, two hypotheses are set based on the results from step 210. A first hypothesis $H_A$ assumes a data bit edge 100 occur at odd transitions 104 and center bit transitions 102 occur at even transitions 104. At second hypothesis $H_B$ assumes a data bit edge 100 occur at even transitions 104 and center bit transitions 102 occur at odd transitions 104.

At 270, for each of these hypotheses $H_A$ and $H_B$, the process continues by integrating across twenty data samples starting at the assumed data bit edge 100. This process of integrating across twenty data samples repeats. At 280, integrations having common hypotheses are accumulated until a peak forms. At 290, step 250 is concluded when a minimum of the accumulated integration results is determined, thereby setting the data bit edges 100 for the meander data bit samples 300.

Embodiments of the present invention provide the system and method to detect meander data bit edges in a one-step process rather than two sets as described above. The one-step process assumes one hypothesis for each possible starting point as described below. Before integrations, however, half of the data samples within a window for a particular hypothesis are toggled. In accordance with some embodiments, the one-step process provides a 1-dB sensitivity advantage over the conventional two-step process for detecting a data bit edge 100. The one-step process also reduces delay in processing the meander encoded data samples 300 over the two-step process. In the examples below, twenty data samples per window are assumed. The window spans one data bit width 12.

Figure 5:
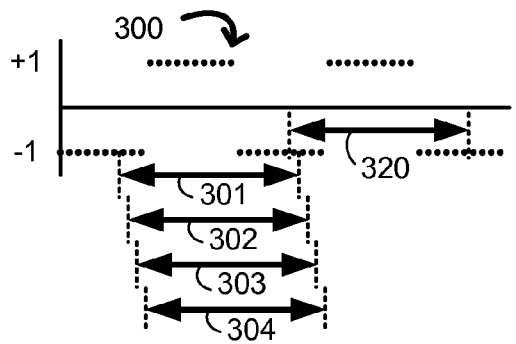
FIG. 5 illustrates various windows each defining an hypothesis, in accordance with some embodiments of the present invention.

FIG. 5 illustrates various windows each defining an hypothesis, in accordance with some embodiments of the present invention. Assuming twenty samples fall within one data bit width 12 and a first hypothesis $H_1$ begins at sample k in the stream of meander encoded data samples 300 and repeats at samples (k+20n), where n is a positive integer. Therefore, the first hypothesis $H_1$ repeats from samples k+20 to k+39 and repeats again from samples k+40 to k+59 and so on. A second hypothesis $H_2$ begins at sample k+1 and repeats at samples (k+1+20n). Data samples within a first window 301 (samples k through k+19) fall within the first hypothesis $H_1$, data samples within a second window 302 (samples k+1 through k+20) fall within the second hypothesis $H_2$, and so on for windows 303, 304, . . . , 320 until twenty hypotheses are defined. Each window has a starting point that is one data sample from the previous hypothesis. Each set of samples spaced by 20 samples (e.g., (k to k+19), (k+20 to k+39) and (k+40 to k+59)) represents a common hypothesis, namely first hypothesis $H_1$. In general a common hypothesis Hp includes windows starting at (k+P−1+20n), where k represents an arbitrary starting point, P represents the hypothesis phase, and n is an integer, where there are 20 samples per window.

Figure 6:
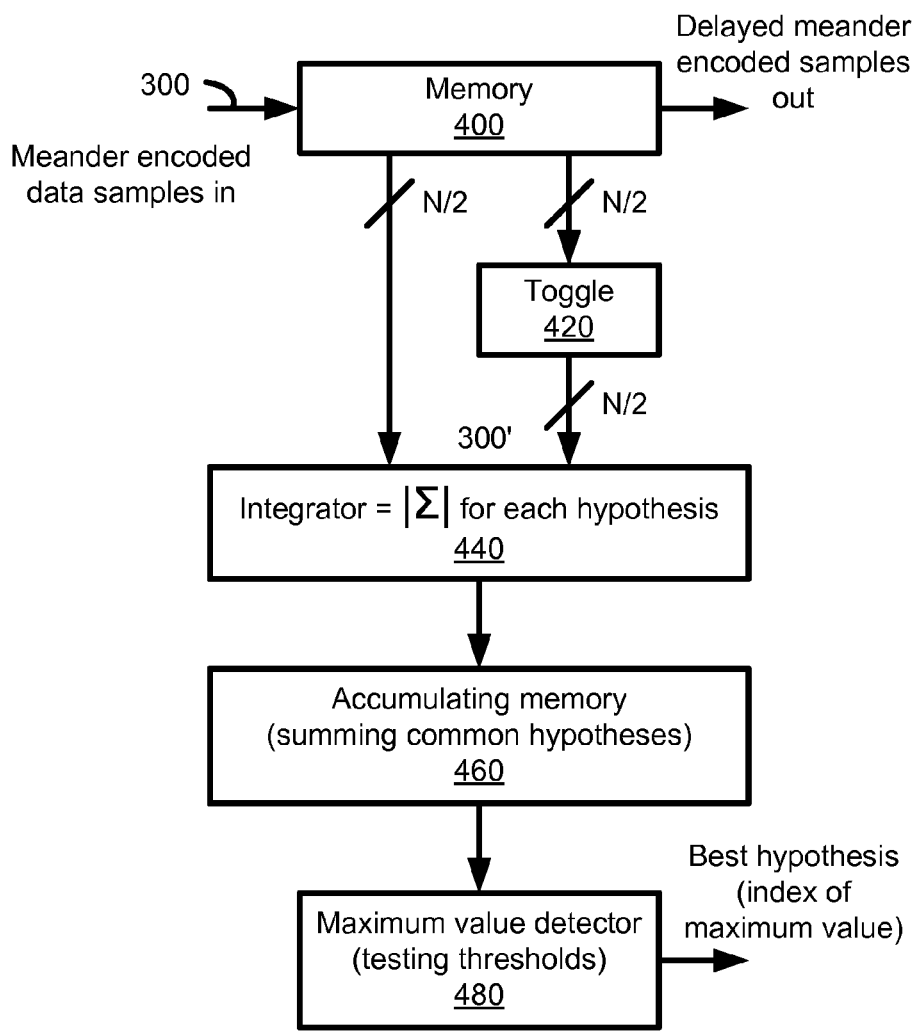
FIG. 6 illustrates a device for detecting a bit edge from a stream of meander encoded data samples, in accordance with some embodiments of the present invention.

FIG. 6 illustrates a device for detecting a bit edge from a stream of meander encoded data samples 300, in accordance with some embodiments of the present invention. The device includes a memory 400, a toggle unit 420, an integrator 440, an accumulating memory 460 and a maximum value detector 480. The memory 400 is coupled receive and store at least N meander encoded data samples 300. Typically, the value N is set to the number of samples within a meander encoded data bit (e.g., N=20). The memory 400 includes an output port to retrieve stored data samples. The memory 400 is configured to provide a first group of N/2 stored samples to the integrator 440 and a second group of N/2 stored samples to the toggle unit 420.

The toggle unit 420 accepts N/2 input samples, toggles each input sample to a complementary value, then provides N/2 complementary or toggled data samples as output samples to the integrator 440. In a binary system having possible data sample values of {0 & 1}, the toggle unit 420 inverts an input value of '0' to an output value of '1' and vice versa. In a binary system having possible data sample values of {−1 & +1}, the toggle unit 420 inverts the sign of an input value. For example, a '−1' input value is toggled to an output value of '+1' and vice versa. In a system having more than two possible input values, input values are also converted a complementary value and provided as an output value. For example, in a system having values {1.0, 0.9, . . . , 0.1, 0.0}, a 1.0 may be converted to a 0.0, 0.9 may be converted to a 0.1 and so on. In a system having values centered about zero, a sign change may be used to toggle the input data.

The integrator 440 integrates the toggled and un-toggled data samples. Each new data sample entering memory 400 represents a hypothesized starting position. Each new data sample entering memory 400 also triggers the memory to shift the data samples over thereby providing a shifted set of N/2 samples directly to the integrator 440 and a second shifted set of N/2 samples indirectly to the integrator 440 via the toggle unit 420. Therefore, each new data sample results in an integrated value for a particular hypothesis.

The accumulating memory 460 accepts a new value for each integration determined by integrator 440. The accumulating memory 460 is configured to accumulate the integrated values of common hypotheses. For example, each time the integrator 440 determines an integration for $H_2$, the accumulating memory adds this result to previous results for $H_2$. As such, the accumulating memory contains an sum for each hypotheses.

A maximum value detector 480 coupled to the accumulating memory 460 analyzes the accumulated data in accumulating memory 460 to find a maximum accumulated value representing the best hypotheses, which determines the data bit edge 100. This best hypothesis may be represented by an index or an offset (e.g., k+3) to the meander encoded data samples 300.

FIGS. 7A-7E and 8A-8E illustrate various windows each defining an hypothesis, un-toggled and toggled samples within each window, and a resulting integrated value for each hypothesis, in accordance with some embodiments of the present invention.

Figure 7A:
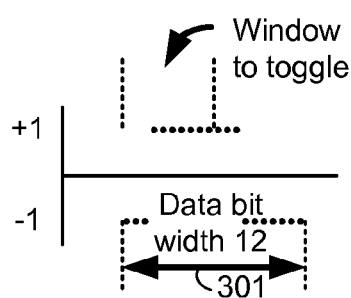
FIGS. 7A-7E and 8A-8E illustrate various windows each defining an hypothesis, un-toggled and toggled samples within each window, and a resulting integrated value for each hypothesis, in accordance with some embodiments of the present invention.
Figure 8A:
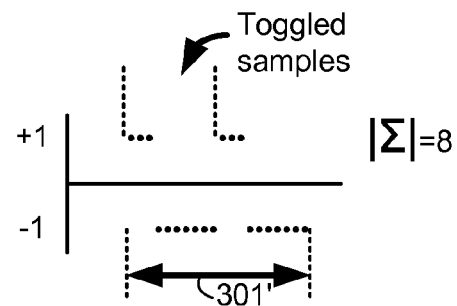

In FIG. 7A, an example twenty data samples of the meander encoded data samples 300 are windowed by window 301. Window 301 defines a first group of data samples, and also defines a starting index for a first hypothesis $H_1$. FIG. 8A shows both the un-toggled and toggled subset of data samples 301' that are provided to the integrator 440. The integrator 440 determines a difference from the un-toggled and toggled values in window 301' to produces an integration results. In this example, a count in window 301' of samples with a first value (e.g., +1) is 6, and the count of a complementary value (e.g., −1) is 14. The absolute value of the difference between these counts (i.e., 6 and 14) is 8. Therefore, the integrated value of the first hypothesis $H_1$ is 8.

Figure 7B:
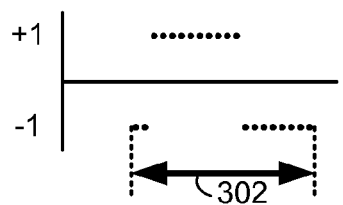
Figure 8B:
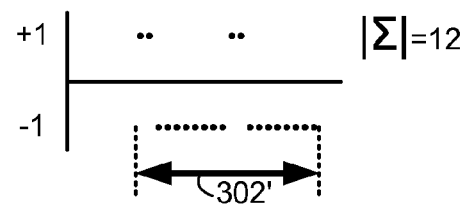

FIG. 7B shows the next data sample being added and a new window 302 containing a new set twenty data samples of the meander encoded data samples 300. Window 301 and window 302 contain 19 overlapping data samples. Window 302 defines a second group of data samples, and also defines a starting index for a second hypothesis $H_2$. FIG. 8B shows the un-toggled and toggled subset of data samples 302' that are provided to the integrator 440. In this example, a count in window 302' of samples with a first value (e.g., +1) is 4, and the count of a complementary value (e.g., −1) is 16. The absolute value of the difference between these counts (i.e., 4 and 16) is 12. Therefore, the integrated value of the second hypothesis $H_2$ is 12.

Figure 7C:
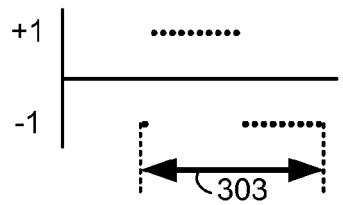
Figure 8C:
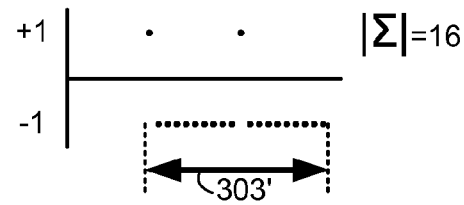

FIG. 7C shows new window 303 containing a new set twenty data samples of the meander encoded data samples 300. Window 303 defines a next group of data samples, and also defines a starting index for a next hypothesis $H_3$. FIG. 8C shows a window 303' including un-toggled and toggled subset of data samples that are provided to the integrator 440. In this example, a count in window 303' of samples with a first value is 2, and the count of a complementary value is 18. The absolute value of the difference between these counts is 16. Therefore, the integrated value of the next hypothesis $H_3$ is 16.

Figure 7D:
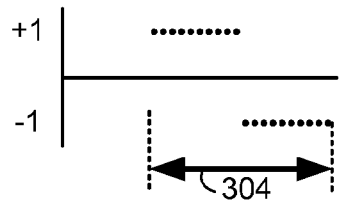
Figure 8D:
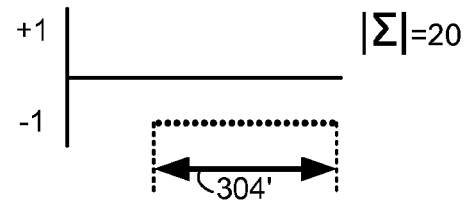

FIG. 7D shows new window 304 containing a new set twenty data samples of the meander encoded data samples 300. Window 304 defines a next group of data samples, and also defines a starting index for a next hypothesis $H_4$. FIG. 8D shows a window 304' including un-toggled and toggled subset of data samples that are provided to the integrator 440. In this example, a count in window 304' of samples with a first value is 0, and the count of a complementary value is 20. The absolute value of the difference between these counts is 20. Therefore, the integrated value of the next hypothesis $H_3$ is 20. An integration result of 20 means that this hypothesis might represent a hypothesis that defines the data bit boundary 100.

Figure 7E:
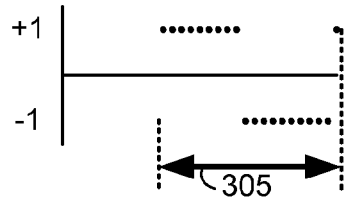
Figure 8E:
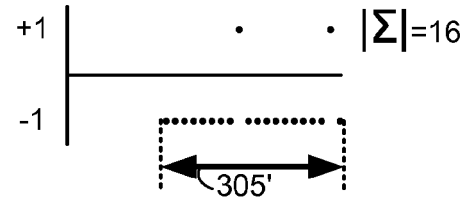

FIG. 7E shows new window 305 containing a new set twenty data samples of the meander encoded data samples 300. Window 305 defines a next group of data samples, and also defines a starting index for a next hypothesis $H_5$. FIG. 8E shows a window 305' including un-toggled and toggled subset of data samples that are provided to the integrator 440. In this example, a count in window 305' of samples with a first value is 2, and the count of a complementary value is 18. The absolute value of the difference between these counts is 16. Therefore, the integrated value of the next hypothesis $H_3$ is 16.

Figure 9:
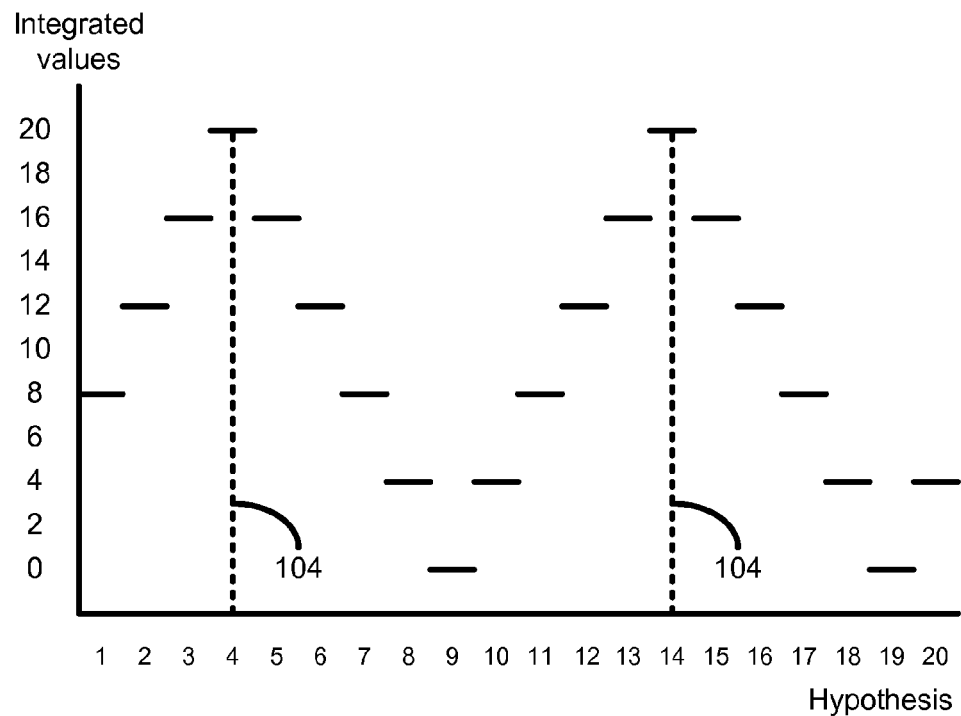
FIG. 9 illustrates integrated values from each hypothesis, in accordance with some embodiments of the present invention.

FIG. 9 illustrates integrated values from each hypothesis, in accordance with some embodiments of the present invention. The graph illustrates the integrated values for 20 hypotheses, e.g., $H_1, H_2, H_3, \ldots, H_{20}$. As described in the example above, hypothesis $H_1$ resulted in an integration of 8. The integration for $H_2$ resulted in an integration result of 12. The integration for $H_3$ resulted in an integration result of 16. The integration for $H_4$ resulted in an integration result of 20. The integration for $H_5$ resulted in an integration result of 16. The integration for $H_6$ resulted in an integration result of 12. The integration for $H_7$ resulted in an integration result of 8. The integration for $H_8$ resulted in an integration result of 4. The integration for $H_9$ resulted in an integration result of 0. The integration for $H_{10}$ resulted in an integration result of 4. The integration for $H_{11}$ resulted in an integration result of 8. The integration for $H_{12}$ resulted in an integration result of 12. The integration for $H_{13}$ resulted in an integration result of 16. The integration for $H_{14}$ resulted in an integration result of 20. The integration for $H_{15}$ resulted in an integration result of 16. The integration for $H_{16}$ resulted in an integration result of 12. The integration for $H_{17}$ resulted in an integration result of 8. The integration for $H_{18}$ resulted in an integration result of 4. The integration for $H_{19}$ resulted in an integration result of 0. The integration for $H_{20}$ resulted in an integration result of 4. A maximum value, which may represent a transition 104, is seen at $H_4$ and also at $H_{14}$.

Figure 10A:
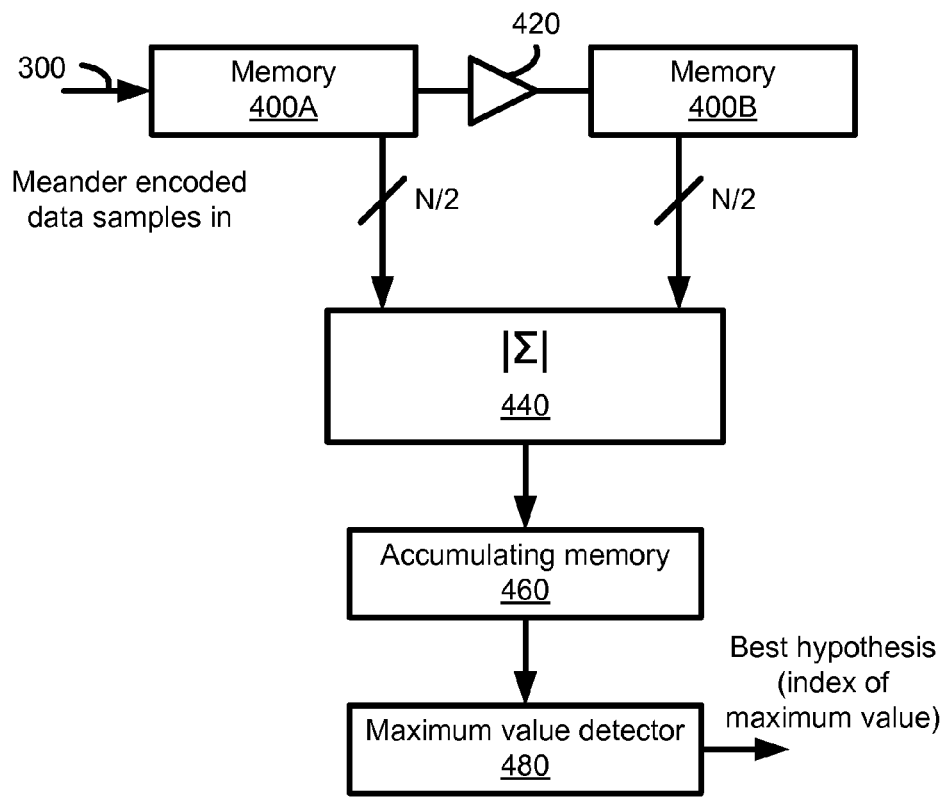
FIGS. 10A, 10B and 11 illustrate alternative embodiments of devices for detecting data bit edges of meander encoded data bits, in accordance with some embodiments of the present invention.
Figure 10B:
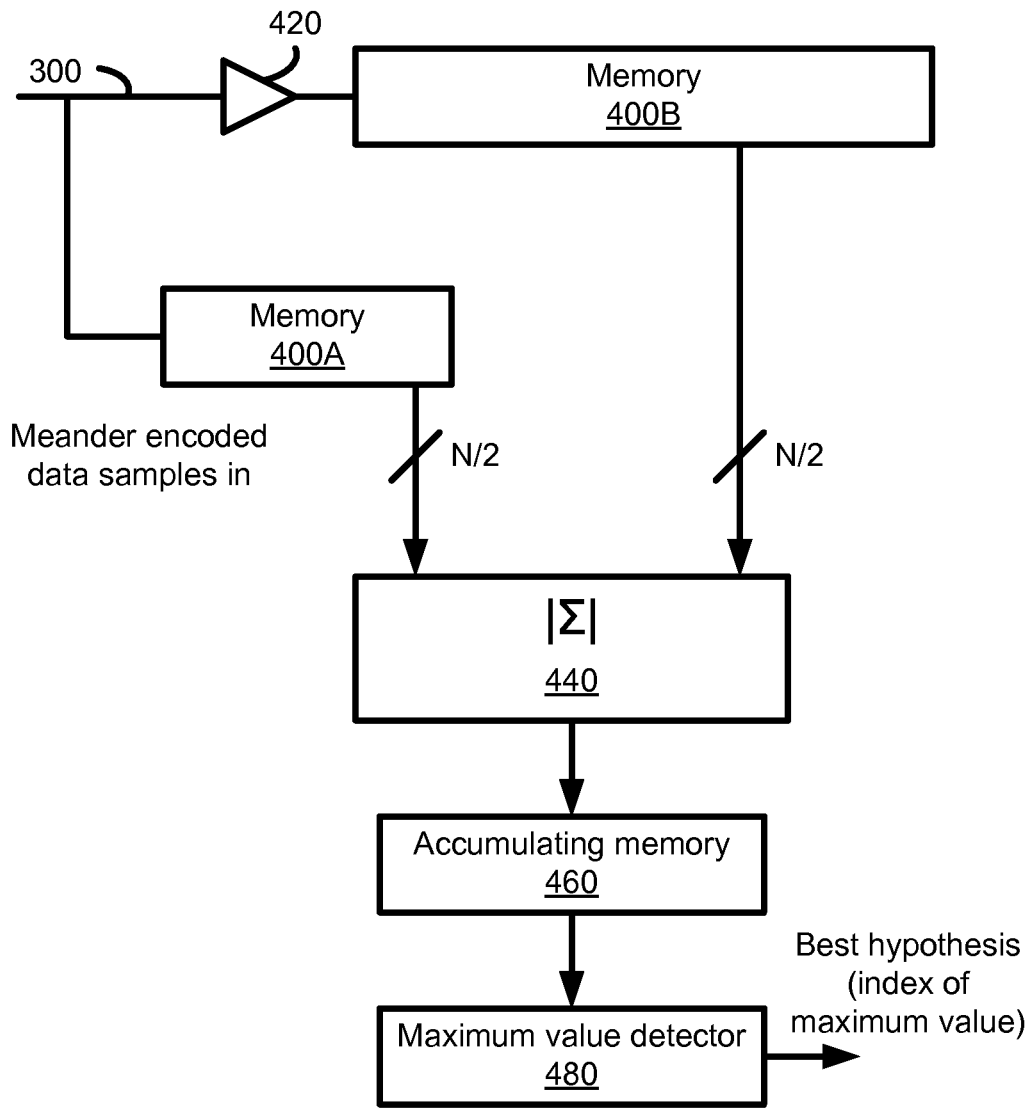
Figure 11:
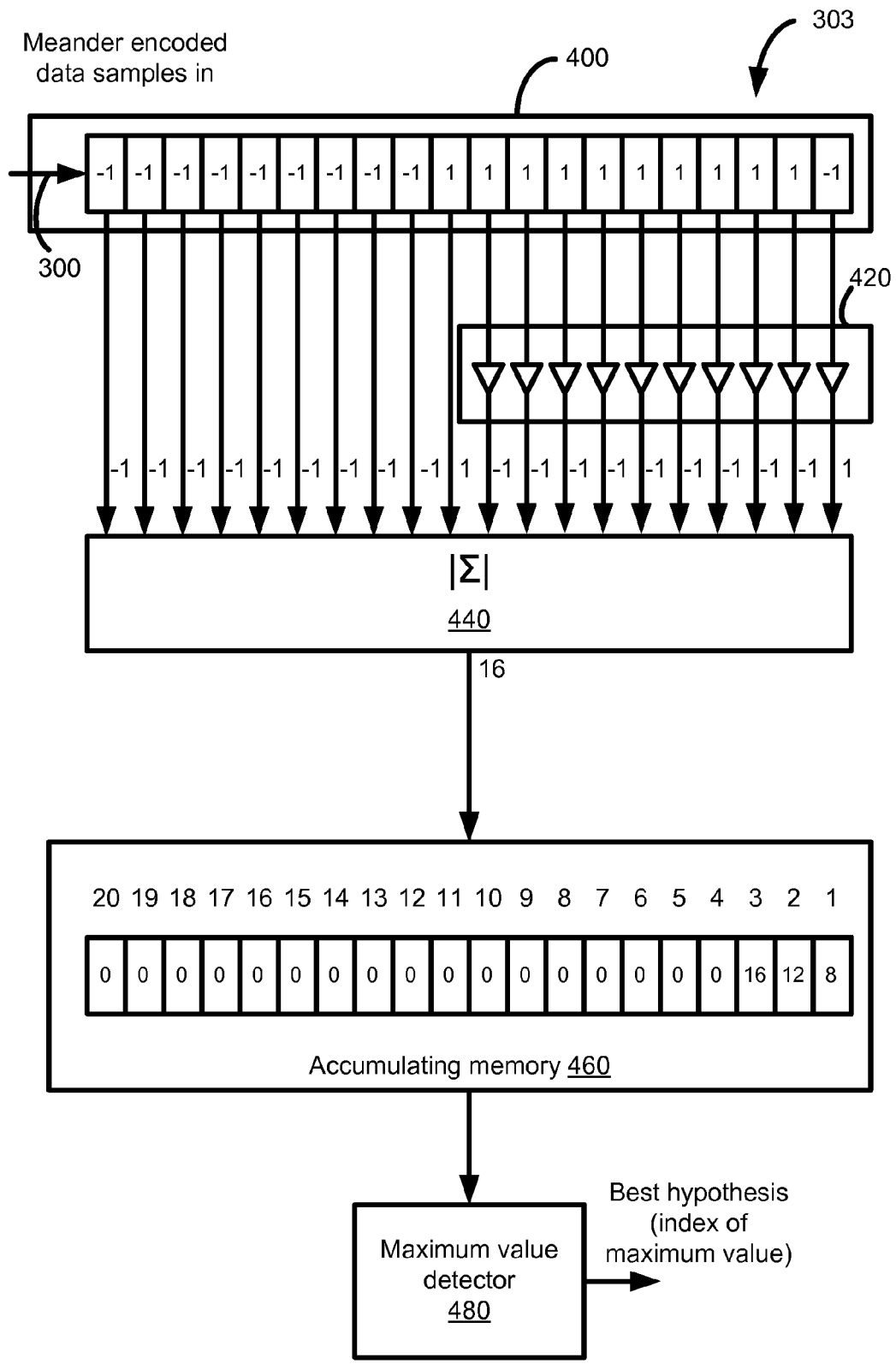

FIGS. 10A, 10B and 11 illustrate alternative embodiments of devices for detecting data bit edges of meander encoded data bits, in accordance with some embodiments of the present invention.

In FIG. 10A, the device includes a memory 400, a toggle unit 420, an integrator 440, an accumulating memory 460 and a maximum value detector 480, as describe above with reference to FIG. 6, however the memory 400 and toggle unit 420 take a different configuration. The memory 400 is shown as a first memory 400A and a second memory 400B. The toggle unit 420 is placed between the first memory 400A and the second memory 400B. The first and second memory 400A, 400B may be directly coupled to integrator 440 without the toggle unit 420 between the memory 400B and the integrator 440. In this alternative embodiment, the first memory 400A may hold a subset of un-toggled data samples. For each new data sample, the first memory 400A provides a sample to the toggle unit 420 which places it in the second memory 400B. Therefore, the second memory 400B holds the toggled data samples. In some embodiments, memory 400A and memory 400B each have limited memory capacity sufficient to hold N/2 data samples.

FIG. 10B shows another alternative arrangement of memory 400 and a toggle unit 420. Memory 400 includes a first memory 400A and a second memory 400B. A toggle unit 420 is placed or positioned anteriorly to the second memory 400B, while both the first and second memory 400A, 400B are coupled to the integrator 440. In this alternative embodiment, the first memory 400A receives meander encoded data samples 300 and holds an un-toggle subset of data samples. The second memory 400B, having the toggle unit 420 anteriorly disposed to the memory 400B, receives toggled data samples and provides toggled data samples to the integrator 440. In some embodiments, memory 400A may have limited capacity of N/2 data samples. Memory 400B may have sufficient capacity to hold N data samples; however, memory 400B provides only N/2 number of data samples to the integrator 440.

FIG. 11 illustrates an embodiment of the device of FIG. 6 using symbols {−1, +1} where N is 20. The meander encoded data samples 300 are shown loaded into memory 400. The loaded sequence, from oldest to newest and includes data samples {−1, +1, +1, +1, +1, +1, +1, +1, +1, +1, +1, −1, −1, −1, −1, −1, −1, −1, −1, −1} within window 303, which represents hypothesis $H_3$. Therefore, older N/2 samples are {−1, +1, +1, +1, +1, +1, +1, +1, +1, +1} and the newer N/2 samples are {+1, −1, −1, −1, −1, −1, −1, −1, −1, −1}. The toggle unit 420 is shown toggling the N/2 older samples but could have equivalently been used to toggle the newer N/2 samples instead. The older N/2 samples feed N/2 inverters within toggle unit 420. The toggle unit 420 complements or inverts the input values and provides the results as output values. In this case, the older N/2 samples {−1, +1, +1, +1, +1, +1, +1, +1, +1, +1} are toggle and presented as output values {+1, −1, −1, −1, −1, −1, −1, −1, −1, −1}. Therefore, the N input ports of the integrator 440 receive the values {+1, −1, −1, −1, −1, −1, −1, −1, −1, −1, −1, +1, −1, −1, −1, −1, −1, −1, −1, −1}. The integrator 440 determines an absolute difference between counts of the number of each symbol. In this case, the integrator 440 is presented a total of 18 ports receiving the "−1" symbol and 2 ports receiving the "+1" symbol. The absolute difference of 18 and 2 is 16. Therefore, integrator 440 provided with input symbols {+1, −1, −1, −1, −1, −1, −1, −1, −1, −1, −1, +1, −1, −1, −1, −1, −1, −1, −1, −1} provides an integrated sum of 16 at its output port. Here, with symbols {−1,+1} with complementary symbols that sum to zero, a simple sum of the input values followed by an absolute value operation results in an appropriate integration. Similarly, if symbols {−1.0, −0.9, −0.8, . . . , +0.8, +0.9, +1.0} are used, a sum and absolute value operations provides the integration values. On the other hand if symbols are used such that complementary symbols do not sum to zero, the integrator counts a number of a first symbol and counts a number of a complementary symbol followed by taking an absolute difference of these total counts to arrive at the integrated sum.

The accumulating memory 460 stores the value from the integrator 440 in its memory in a register or location appropriate for this hypothesis. As seen, memory location for $H_3$ holds the integration value of 16 for this hypothesis. The previous integration results for $H_2$ and $H_1$ are shown in the accumulating memory 460 as values 12 and 8. Because the registers are initially empty or zero, the accumulating memory 460 effectively stores the integration value in the empty location. A subsequent integration result for $H_3$ will be added to the past integration result for $H_3$ and stored over the previous register value. This process is described further below with reference to FIGS. 13A and 13B.

Figure 12:
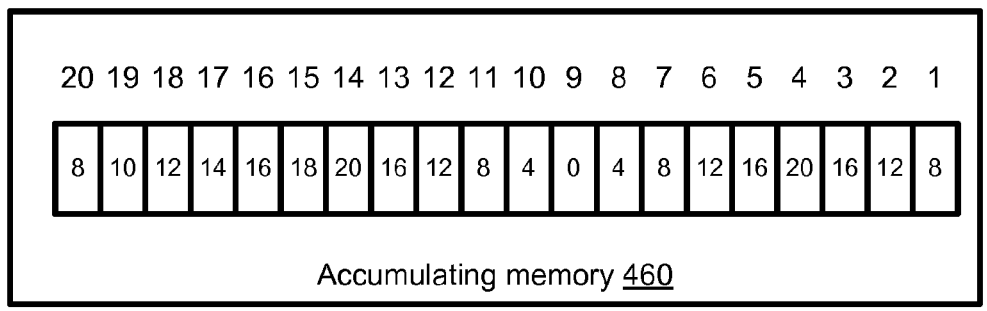
FIG. 12 illustrates an accumulating memory after one complete cycle through each hypothesis, in accordance with some embodiments of the present.

FIG. 12 illustrates an accumulating memory after one complete cycle through each hypothesis, in accordance with some embodiments of the present invention. This example illustrates integrated values of a first set of 20 hypotheses ($H_1$, . . . , $H_{20}$) defined by integrations over 20 windows (window 301 to 320) of the meander encoded data samples 300. After completion of the first set of 20 hypotheses, the integrated values for a first three hypotheses $H_1$, $H_2$, $H_3$, are {8, 12, 16} as described above with reference to FIG. 11. For the remaining hypotheses $H_4$, $H_5$, $H_6$, $H_7$, $H_8$, $H_9$, $H_{10}$, $H_{11}$, $H_{12}$, $H_{13}$, $H_{14}$, $H_{15}$, $H_{16}$, $H_{17}$, $H_{18}$, $H_{19}$, $H_{20}$, the accumulating memory contains {20, 16, 12, 8, 4, 0, 4, 8, 12, 16, 20, 18, 16, 14, 12, 10, 8}. The maximum value detector 480 is unable to determine a best hypothesis because the maximum value in the accumulated memory is not unique. That is, the maximum value is 20, however, both $H_4$ and $H_{14}$ contain this maximum value.

Figure 13A:
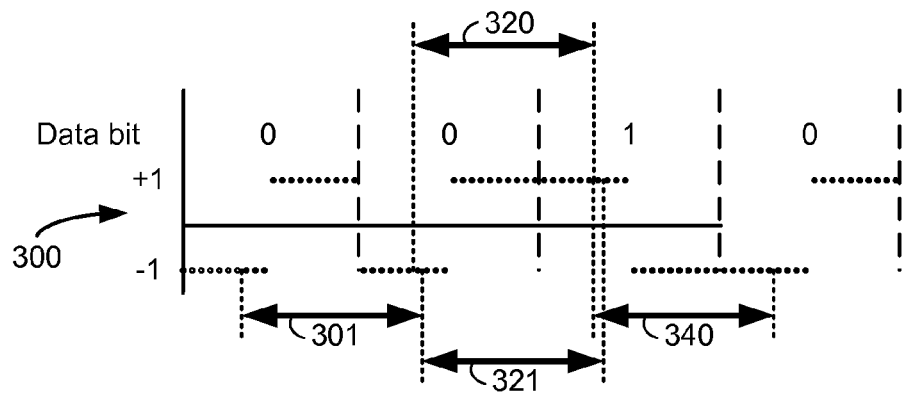
FIGS. 13A and 13B illustrate data samples of a meander encoded data bit stream and a corresponding accumulating memory coupled to a maximum value detector after testing each hypothesis twice, in accordance with some embodiments of the present invention.
Figure 13B:
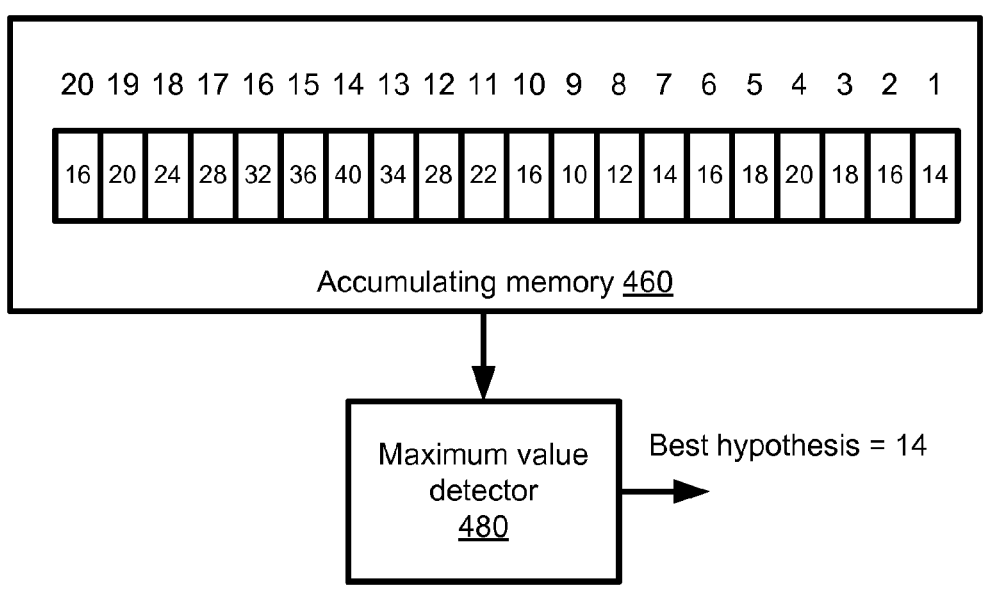

FIGS. 13A and 13B illustrate data samples of a meander encoded data bit stream and a corresponding accumulating memory coupled to a maximum value detector after testing each hypothesis twice, in accordance with some embodiments of the present invention. In FIG. 13A, the meander encoded data samples 300 represent data bits {0, 0, 1, 0}. For a first pass through each hypothesis, integration occurs for hypotheses $H_1$ to $H_{20}$ using windows 301 through 320, respectively. The process continues with a second pass through each hypothesis such that integration occurs for again for hypotheses $H_1$ to $H_{20}$, however, the next set of windows (windows 321 through 340) are used. This process of repeating the integration over each hypothesis may repeat over several successive blocks of windows.

FIG. 13B illustrates accumulated sum of common hypotheses in the accumulating memory 460. In this illustration, the accumulating memory 460 has accumulated integrated values of common hypotheses for a first set of windows 301 to 320 for hypotheses $H_1$ to $H_{20}$ and a second set of windows 321 to 340 for hypotheses $H_1$ to $H_{20}$, respectively. After integration of each hypothesis a second time, the integration result is added to the corresponding location in the accumulating memory. That is, the hypotheses $H_1$, $H_2$, $H_3$, $H_4$, $H_5$, $H_6$, $H_7$, $H_8$, $H_9$, $H_{10}$, $H_{11}$, $H_{12}$, $H_{13}$, $H_{14}$, $H_{15}$, $H_{16}$, $H_{17}$, $H_{18}$, $H_{19}$, $H_{20}$} now contain the accumulated sum of the current set of integrations {6, 4, 2, 0, 2, 4, 6, 8, 10, 12, 14, 16, 18, 20, 18, 16, 14, 12, 10, 8} (as may be determined from the samples shown in FIG. 13A) and the previous memory contents {8, 12, 16, 20, 16, 12, 8, 4, 0, 4, 8, 12, 16, 20, 18, 16, 14, 12, 10, 8} (from FIG. 12) of the accumulating memory 460 to result in current contents {14, 16, 18, 20, 18, 16, 14, 12, 10, 16, 22, 28, 34, 40, 36, 32, 28, 24, 20, 16} of the accumulating memory 460. The maximum value detector 480 in this example determines the best hypothesis is hypothesis $H_{14}$ because the accumulated memory 460 contains a maximum value larger than all other accumulated sums.

Figure 14:
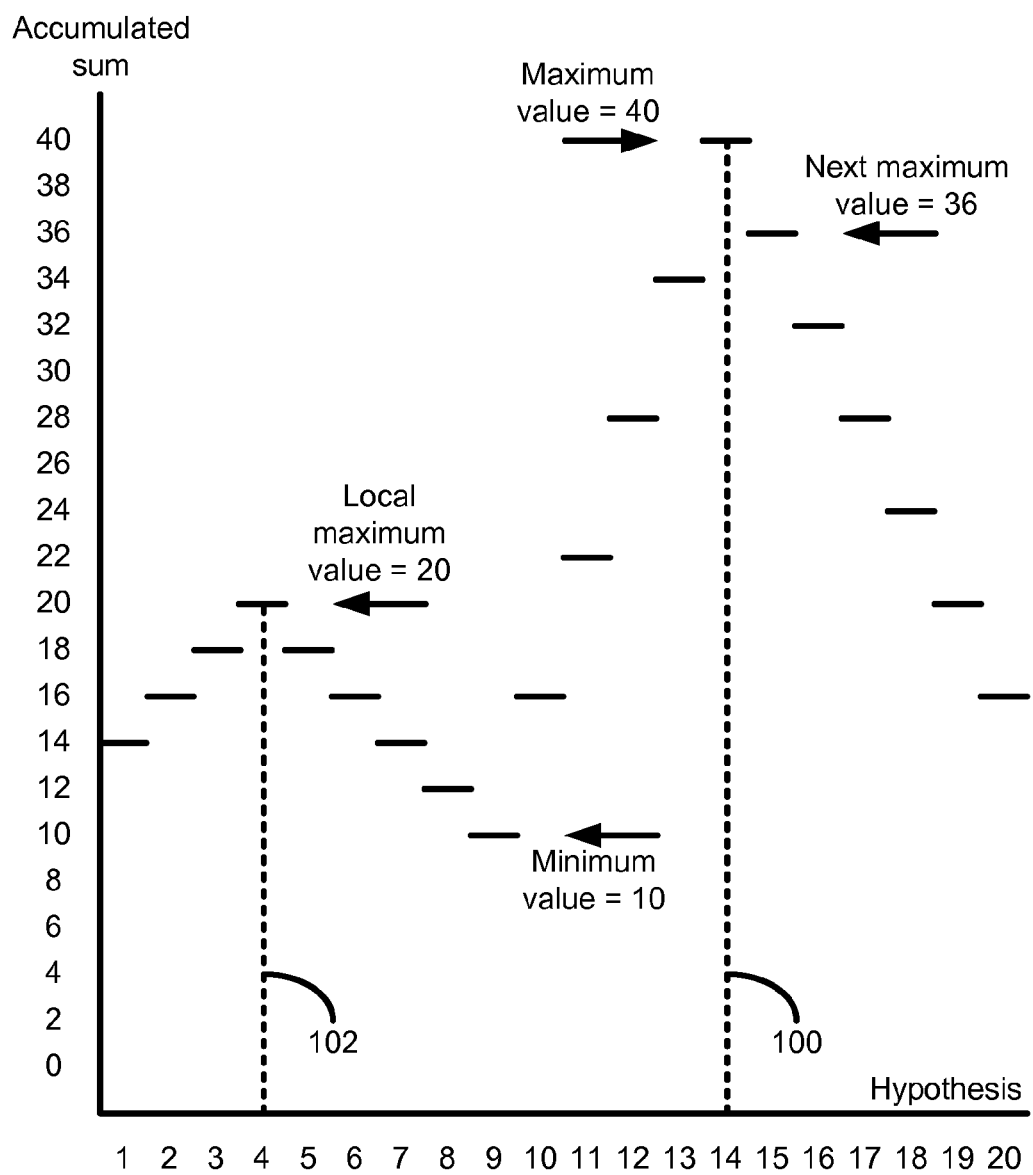
FIG. 14 illustrates a graph of accumulated values of various common hypotheses, in accordance with some embodiments of the present invention.

FIG. 14 illustrates a graph of accumulated values of various common hypotheses, in accordance with some embodiments of the present invention. The graph illustrates in chart form the data stored in the accumulating memory 460. Here, the accumulating memory 460 contains values {14, 16, 18, 20, 18, 16, 14, 12, 10, 16, 22, 28, 34, 40, 36, 32, 28, 24, 20, 16} corresponding to hypotheses $H_1$ to $H_{20}$. In some embodiments, a maximum accumulated value corresponds to the best hypothesis, which is the fourteenth hypothesis $H_{14}$ in this example. Accordingly, a data bit edge 100 is located at the starting point of fourteenth hypothesis $H_{14}$. Also shown is a next maximum value corresponding to hypothesis $H_{15}$ and a minimum value corresponds to hypothesis $H_9$. At hypothesis $H_4$ a local maximum is shown. Here, the maximum value at $H_{14}$ represents a bit edge 100 and the local maximum represents a center bit transition 102 at hypothesis $H_4$. An index for a local maximum may be determined from the index for the maximum value by adding or subtracting 10 from the index of the maximum value or equivalently by the modulo function mod(10+maximum value index, 20). Here, the maximum value index is 14 and the local maximum value index is mod(10+14,20)=4 represented by hypothesis $H_4$.

Figure 15:
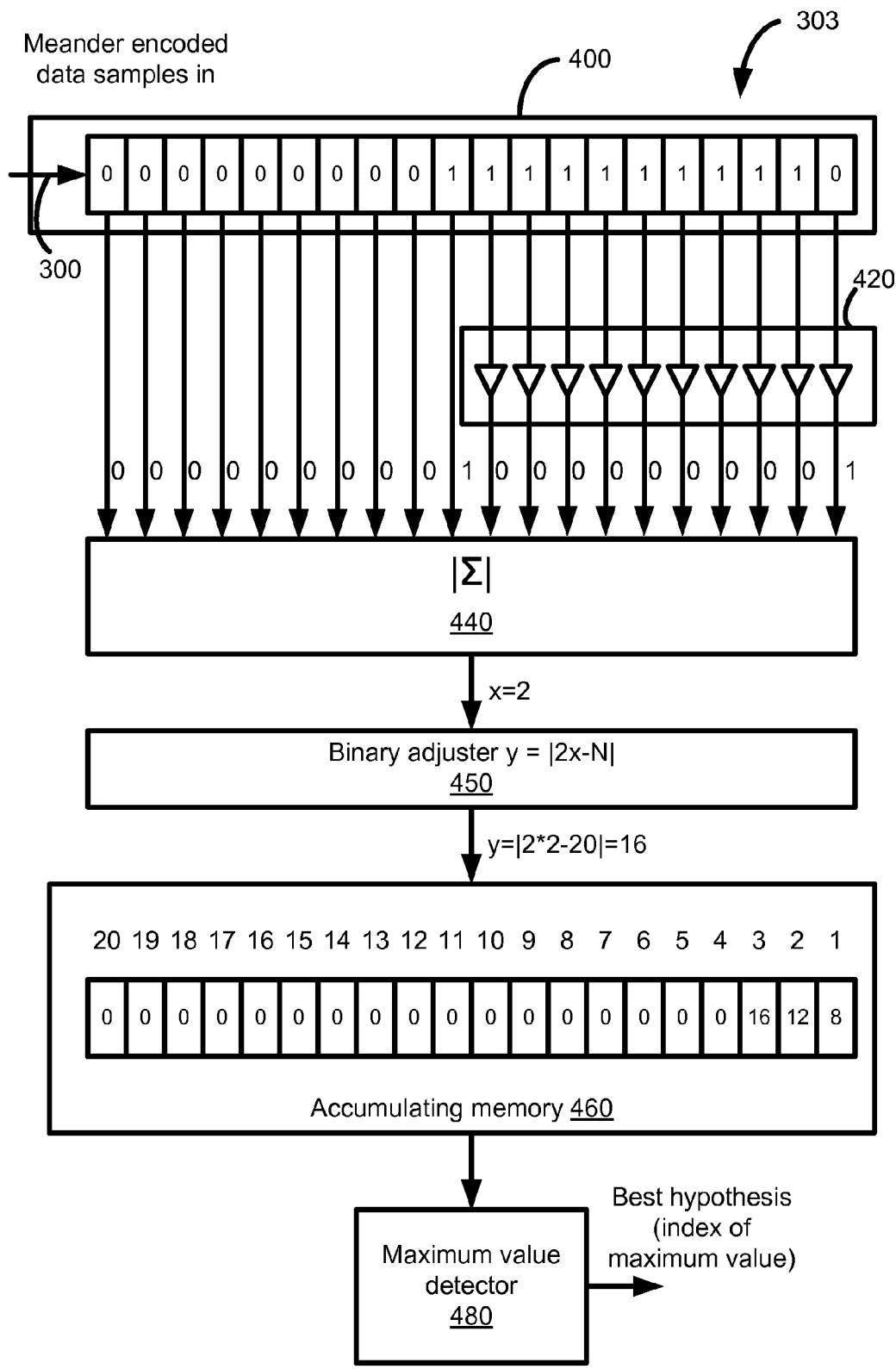
FIG. 15 illustrates a device for detecting data bit edges of meander encoded data bits using symbols {0, 1}, in accordance with some embodiments of the present invention.

FIG. 15 illustrates a device for detecting data bit edges of meander encoded data bits using symbols {0, 1}, in accordance with some embodiments of the present invention. Again, N is 20 and the meander encoded data samples 300 are shown loaded into memory 400. The loaded sequence, from oldest to newest, includes data samples {0, 1, 1, 1, 1, 1, 1, 1, 1, 1, 1, 0, 0, 0, 0, 0, 0, 0, 0, 0} for window 303, which represents hypothesis $H_3$. The older N/2 samples are {0, 1, 1, 1, 1, 1, 1, 1, 1, 1} and the newer N/2 samples are {1, 0, 0, 0, 0, 0, 0, 0, 0, 0}. The toggle unit 420 toggles inverts the received samples {0, 1, 1, 1, 1, 1, 1, 1, 1, 1} to produce inverted or toggled samples {1, 0, 0, 0, 0, 0, 0, 0, 0, 0}. The N input ports of the integrator 440 receive the values {1, 0, 0, 0, 0, 0, 0, 0, 0, 0, 1, 0, 0, 0, 0, 0, 0, 0, 0, 0}. The integrator 440 may determine an absolute difference between counts of the number of each symbol. Alternatively, the integrator 440 performs a sum of the binary data and provides an output value of x=2.

In some embodiments, the binary adjuster 450 provides the necessary adjustment based on a relationship between a sum of binary values and an absolute difference of symbol counts. Because the output value 2 does not represent a difference between counts of each symbol, a binary adjuster 450 is included to condition the summation output to a proper absolute difference of counts. The binary adjuster unit 450 performs the following operation to condition the summation output:

$$y=|2x-N|,$$

where x represents a sum of binary symbols {0, 1} and N represents the size of the window and y represents the absolute difference of the counts. Here, the populated equation is:

$$y=|2*2-20|=16.$$

Figure 16A:
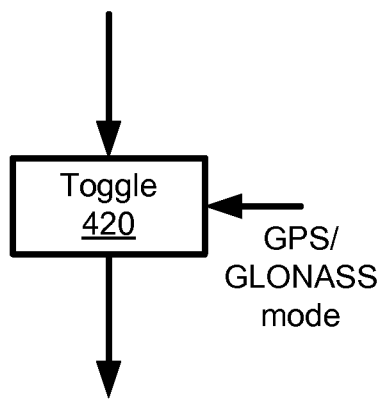
FIGS. 16A and 16B illustrate a toggle unit with a control port, in accordance with some embodiments of the present invention.
Figure 16B:
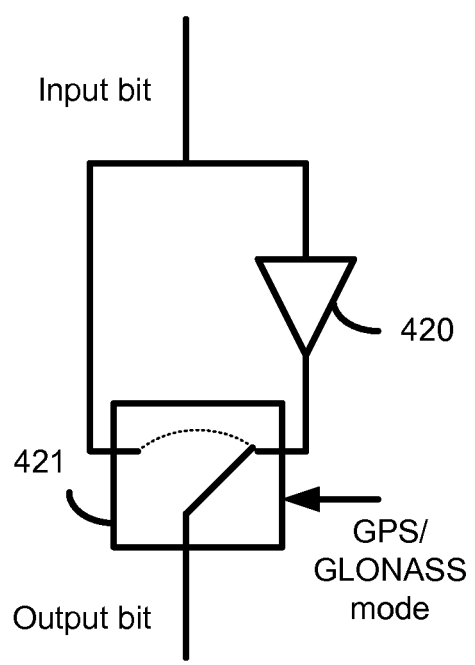

FIGS. 16A and 16B illustrate a toggle unit with a control port, in accordance with some embodiments of the present invention. A single device may be used for detecting data bit edges for both meander encoded data samples (as those provided by a GLONASS satellite) and non-meander encoded data samples (as those provided by a GPS satellite). FIG. 16A illustrates a toggle unit 420 receiving either meander encoded data samples or non-meander encoded data samples. When the toggle unit 420 receives meander encoded data samples, the toggle function is enabled. When the toggle unit 420 receives non-meander encoded data samples, the toggle function is disabled.

In FIG. 16B, the toggle unit 420 may be bypassed with a switch 421. When receiving meander encoded data samples, the switch 421 provides an output bit from the toggle unit 420. When receiving non-meander encoded data samples, the switch 421 provides an output bit that bypasses the toggle unit 420 and passes the input value as an output value.

Figure 17:
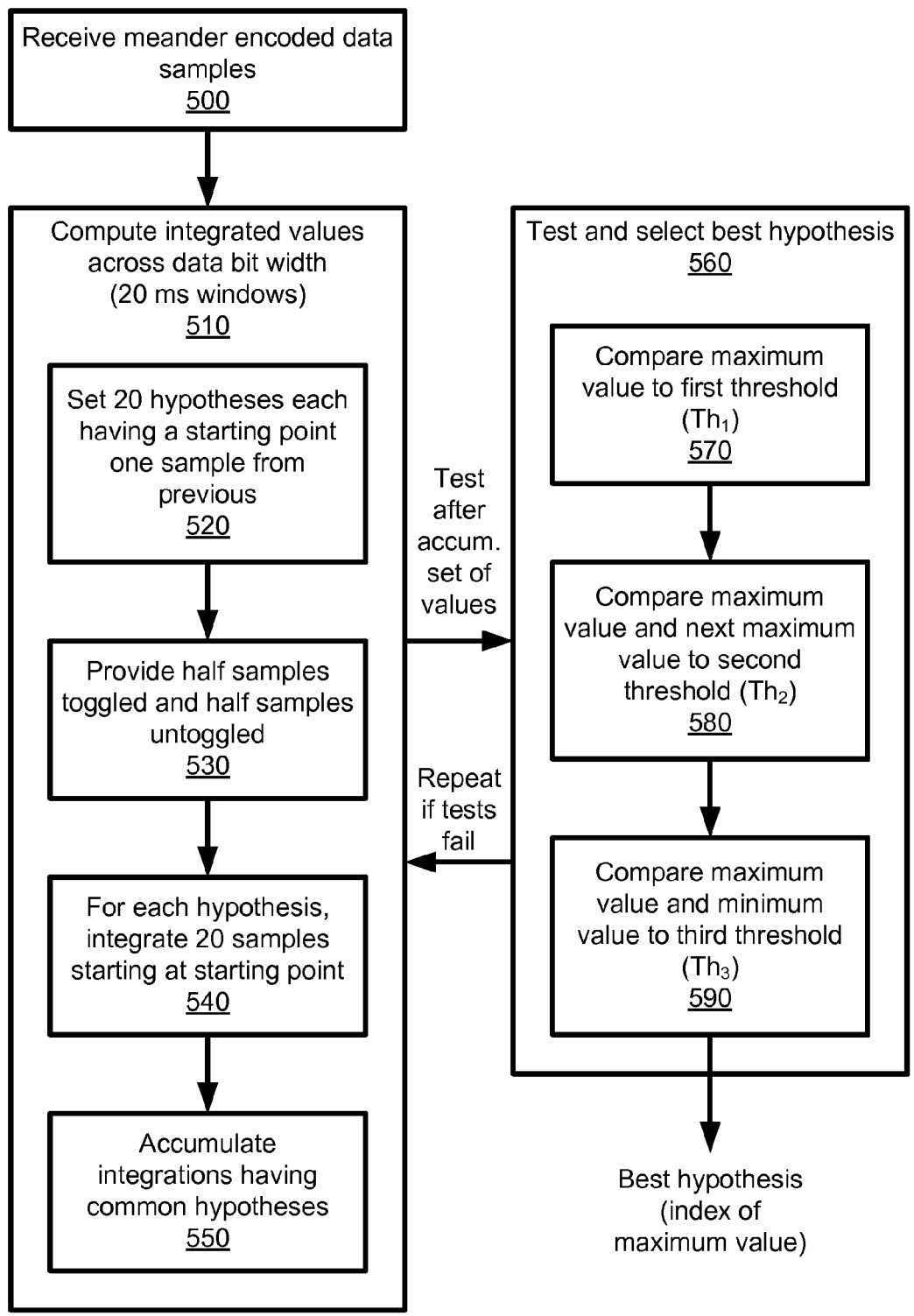
FIG. 17 illustrates a method for detecting data bit edges, in accordance with some embodiments of the present invention.

FIG. 17 illustrates a method for detecting data bit edges, in accordance with some embodiments of the present invention. The method involves a one-step process to determine data bit edge 100 in a 20 milliseconds window. At 500, the method begins by receiving meander encoded data samples 300. At 510, (including 520-550), the single set of hypotheses testing begins. The conventional method described with reference to FIG. 4 included two steps of hypotheses testing. That is, a first 10-ms window was determined from 10 hypotheses ($H_1$ to $H_{10}$) in a first step (step 210) and a second 20-ms window was determined from 2 hypotheses ($H_A$, $H_B$) in a second step (step 250). Unlike the conventional method, FIG. 17 shows a single step where the 20-ms bit edges 100 are detected with a single set of 20 hypotheses ($H_1$ to $H_{20}$). At 510, integrated values are computed across a data bit width (e.g., 20 ms windows 301 to 320). At 520, the method sets 20 hypotheses ($H_1$ to $H_{20}$). At 530, for each hypothesis, the method toggles a subset or half of the data samples in memory 400 and provides the toggled subset data samples and un-toggled subset of data samples to an integrator 440. At 540, the method integrates 20 data samples for each hypothesis. The 20 integrated samples include the toggled and un-toggled halves of the data samples 300. This process is repeated for each hypothesis. At 550, the integration results are accumulated, separately for each hypothesis, in an accumulating memory 460. This process repeats multiple times for each hypothesis and each resulting integration result is accumulated with the previous accumulated value for each common hypothesis.

At 560 (including 570-590), a best hypothesis is tested for after a full set of hypotheses is integrated and accumulated. The tests described below reference threshold values, which may be set to a constant or may dynamically change through experience learned from accumulating integrated values. Additionally, the threshold values may be set to avoid selecting a maximum value that falsely identifies a bit edge. The threshold values may be set based on simulation and/or experimentation. The threshold values may also account for distortion due to noise. If the best hypothesis testing fails, the process, e.g., from 530 to 550 repeats.

At 570, the method tests for a best hypothesis by comparing a maximum value to a first threshold $Th_1$. For example, $Th_1$ may be a value 100; therefore, five or more repetitions of updating accumulated values for each hypothesis would be necessary. In some embodiments, a threshold value is selected to represent 22 dB-Hz for an integration across one second and 18 dB-Hz for an integration across two seconds (see TABLE 1 below). A first threshold $Th_1$ set to a higher value will result in additional repetitions but the certainty of a correct result (finding a true bit edge) will increase. This test distinguishes a strong signal from a weak signals.

At 580, the method test for a best hypothesis by comparing a maximum value and a next maximum value to a second threshold $Th_2$. For example, a difference between the maximum value and the next maximum value may be computed. This difference is compared to the second threshold $Th_2$. Using the data in FIG. 14, this difference is 4 (maximum value of 40 less the next maximum value of 36). This second threshold $Th_2$ may be set to a value of 10; therefore, five or more accumulations for each hypothesis may be used. Comparing this difference with threshold $Th_2$ helps to determine if there is sufficient discrimination between the maximum value and the next maximum value. For example, threshold $Th_2$ may be a value 30, and comparing 40 to 36 may be insufficient discrimination to ensure that this maximum value is not a false bit edge. Alternatively, a ratio rather than a difference may be computed using the maximum value and the next maximum value. This ratio is compared to the second threshold $Th_2$ (e.g., maximum:next maximum >$Th_2$=1.1:1.0). Using ratios help to avoid scaling issues that would otherwise occur with noisy data.

At 590, one of two tests may be performed. In a GPS system, the method may include testing a maximum value and a minimum value with a third threshold $Th_3$. This comparison may include comparing a difference of a maximum value and a minimum value with a third threshold $Th_3$. Alternatively, this comparison may include comparing a ratio of a maximum value and a minimum value with the third threshold $Th_3$. Again, using the example accumulated sums from FIG. 14, a maximum value is 40 and a minimum value is 10 resulting in a difference of 30. If $Th_3$=75, this difference would not be large enough. Three or more additional accumulations may be necessary in order to pass this test. Alternatively, if a ratio between the maximum value and the minimum value is formed (40:10=4), this resulting ratio may be compared to a threshold (e.g., $Th_3$=2:1 or 10:1). As stated above, a ratio-type test has the advantage of being less dependent on the number of accumulation cycles therefore acts to automatically scale the test values.

At 590 in a GLONASS system, the method tests a maximum value and a local maximum value with a third threshold $Th_3$. This comparison may include comparing a difference of a maximum value and a local maximum value with a third threshold $Th_3$. Alternatively, this comparison may include comparing a ratio of a maximum value and a local maximum value with the third threshold $Th_3$. Using the example accumulated sums from FIG. 14, a maximum value is 40 and a local maximum value is 20 resulting in a difference of 20. If $Th_3$=75, this difference would not be large enough. Additional accumulations may be necessary in order to pass this test. Alternatively, if a ratio between the maximum value and the minimum value is formed (40:20=2), this resulting ratio may be compared to a threshold (e.g., $Th_3$=2:1 or 10:1). This test distinguishes a signal having a sufficient number of information transitions from a signal with too many sequential common information bits.

If the tests at 570, 580 and 590 each fail to pass the threshold tests, the method repeats at 530, 540 and 550 to accumulate additional common hypotheses thereby increasing the confidence in selecting a maximum value and finding the best hypothesis representing a data bit edge. As described above, testing occurs every 20 ms after a full set of hypotheses has be accumulated. Instead of testing after accumulating a single set of hypotheses, testing at 570, 580 and 590 may occur after the device has integrated over a set number of common hypotheses, or equivalently, over a set duration of time. For example, testing may occur after 1 second of integration and accumulation (50 information bits) has occurred. Alternatively, testing may occur after 2 or 3 seconds of integration and accumulation (100 or 150 bits) have occurred.

TABLE 1 provides performance of the data bit edge detection algorithm described above using an integration duration of 1, 2 and 3 seconds.

TABLE 1

| Selected Integration Duration | Selected $C/N_0$ (in dB-Hz) | Resulting $P_{err}$ | Resulting $P_{miss}$ |
|---|---|---|---|
| 1 second | 19 | 2.3e-3 | 11.1% |
| 1 second | 20 | 4.6e-4 | 8.3% |
| 1 second | 21 | 1.2e-4 | 6.4% |
| 1 second | 22 | 4.0e-5 | 4.4% |
| 2 seconds | 18 | 6.1e-5 | 3.6% |
| 3 seconds | 15 | 3.3e-3 | 9.8% |
| 3 seconds | 16 | 4.0e-4 | 6.2% |
| 3 seconds | 17 | 2.0e-5 | 3.6% |

The table shows a selected integration duration and a selected representation of a selected signal-to-noise ratio ($C/N_0$), as well as a resulting probability of false edge detection ($P_{err}$) and a resulting probability of no edge detection ($P_{miss}$). For example, with a one-second integration (50 information bits) and $C/N_0$ of 19 db-Hz, the resulting probability of erroneously selecting an incorrect edge is $P_{err}=2.3\times10^{-3}$ and the resulting probability of finding no edge is $P_{miss}$=11.1%. The resulting probability of finding no edge ($P_{miss}$) may be reduced by repeating the integration over a new set of samples.

Position determination techniques described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in an SPS such as Global Positioning System (GPS), Galileo, GLONASS or Compass may transmit a signal marked with a PN code that is distinguishable from PN codes transmitted by other SVs in the constellation (e.g., using different PN codes for each satellite as in GPS or using the same code on different frequencies as in GLONASS). In accordance with certain aspects, the techniques presented herein are not restricted to global systems for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

As used herein, a mobile station (MS) refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile station."

The methodologies described herein may be implemented by various means depending upon the application. For example, these methodologies may be implemented in hardware, firmware, software, or any combination thereof. For an implementation involving hardware, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processing unit. Memory may be implemented within the processing unit or external to the processing unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable medium may take the form of an article of manufacture. Computer-readable medium includes physical computer storage medium. A storage medium may be any available medium that can be accessed by a computer. By way of example, and not limitation, such computer-readable medium can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processing units to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for detecting a bit edge from a stream of meander encoded data samples, the method comprising:
    receiving meander encoded data samples;
    computing a set of accumulated values for a corresponding set of bit edge phases, wherein computing each accumulated value of the set of accumulated values comprises:
        providing a toggled subset of the meander encoded data samples; and
        integrating the toggled subset of the meander encoded data samples with an un-toggled subset of the meander encoded data samples to produce the accumulated value; and
    selecting a maximum value of the set of accumulated values as the data bit edge.

2. The method of claim 1, wherein the meander encoded data samples comprise 20 samples per information bit encoded with a meander code and wherein the information bit spans 20 ms.

3. The method of claim 1, wherein the act of providing the toggled subset of the meander encoded data samples comprises passing a data sample of the meander encoded data samples through an inverter.

4. The method of claim 1, wherein the act of providing the toggled subset of the meander encoded data samples comprises changing a sign of a data sample of the meander encoded data samples.

5. The method of claim 1, wherein the act of providing the toggled subset of the meander encoded data samples comprises providing 10 toggled data samples from the meander encoded data samples.

6. The method of claim 1, wherein the accumulated value comprises a difference between:
    a count of a first value contained in the toggled and un-toggled subsets; and
    a count of a complementary value contained in the toggled and un-toggled subsets.

7. The method of claim 1, wherein the accumulated value comprises an absolute value.

8. The method of claim 1, further comprising repeating the act of computing the set of accumulated values, wherein each accumulated value comprises a sum of accumulated values having a common bit edge phase.

9. The method of claim 1, wherein the act of selecting the maximum value of the set of accumulated values comprises:
    searching for the maximum value; and
    comparing the maximum value to a first threshold ($Th_1$).

10. The method of claim 1, wherein the act of selecting the maximum value of the set of accumulated values comprises:
    searching for the maximum value;
    finding a next largest value; and
    comparing a ratio between the maximum value and the next largest value to a second threshold ($Th_2$).

11. The method of claim 1, wherein the act of selecting the maximum value of the set of accumulated values comprises:
    searching for the maximum value;
    finding a local maximum value; and
    comparing a ratio between the maximum value and the local maximum value to a third threshold ($Th_3$).

12. A mobile station for detecting a bit edge from a stream of meander encoded data samples, the mobile station comprising:
  means for receiving meander encoded data samples;
  means for computing a set of accumulated values for a corresponding set of bit edge phases, wherein computing each accumulated value of the set of accumulated values comprises:
    means for providing a toggled subset of the meander encoded data samples; and
    means for integrating the toggled subset of the meander encoded data samples with an un-toggled subset of the meander encoded data samples to produce the accumulated value; and
  means for selecting a maximum value of the set of accumulated values as the data bit edge.

13. The mobile station of claim 12, wherein the means for providing the toggled subset of the meander encoded data samples comprises means for changing a sign of a data sample of the meander encoded data samples.

14. The mobile station of claim 12, wherein the means for providing the toggled subset of the meander encoded data samples comprises means for providing 10 toggled data samples from the meander encoded data samples.

15. The mobile station of claim 12, further comprising means for repeating the act of computing the set of accumulated values, wherein each accumulated value comprises a sum of accumulated values having a common bit edge phase.

16. The mobile station of claim 12, wherein the means for selecting the maximum value of the set of accumulated values comprises:
  means for searching for the maximum value; and
  means for comparing the maximum value to a first threshold ($Th_1$).

17. The mobile station of claim 12, wherein the means for selecting the maximum value of the set of accumulated values comprises:
  means for searching for the maximum value;
  means for finding a next largest value; and
  means for comparing a ratio between the maximum value and the next largest value to a second threshold ($Th_2$).

18. The mobile station of claim 12, wherein the means for selecting the maximum value of the set of accumulated values comprises:
  means for searching for the maximum value;
  means for finding a local maximum value; and
  means for comparing a ratio between the maximum value and the local maximum value to a third threshold ($Th_3$).

19. A mobile station for detecting a bit edge from a stream of meander encoded data samples, the mobile station comprising:
  a memory configured to receive meander encoded data samples, wherein possible bit edge phases are defined from the meander encoded data samples and each of the possible bit edge phases corresponds to a possible bit edge phase;
  a toggle unit coupled to the memory, wherein the toggle unit toggles a subset of the meander encoded data samples;
  an integrator coupled to the memory and the toggle unit, the integrator configured to integrate the toggled subset of the meander encoded data samples with an un-toggled subset of the meander encoded data samples to produce an accumulated value corresponding to the possible bit edge phase;
  an accumulating memory coupled to the integrator, the accumulator configured to compute a set of accumulated values for a corresponding set of the possible bit edge phases; and
  a maximum value detector coupled to the accumulating memory, the maximum value detector configured to select a maximum value of the set of accumulated values as the data bit edge.

20. A mobile station for detecting a bit edge from a stream of meander encoded data samples, the mobile station comprising:
  a first memory and a second memory configured to receive meander encoded data samples, wherein possible bit edge phases are defined from the meander encoded data samples and each of the possible bit edge phases corresponds to a possible bit edge phase;
  a toggle unit disposed between the first memory and the second memory, wherein the toggle unit toggles a subset of the meander encoded data samples;
  an integrator coupled to the first memory and the second memory, the integrator configured to integrate the toggled subset of the meander encoded data samples with an un-toggled subset of the meander encoded data samples to produce an accumulated value corresponding to the possible bit edge phase;
  an accumulating memory coupled to the integrator, the accumulator configured to compute a set of accumulated values for a corresponding set of the possible bit edge phases; and
  a maximum value detector coupled to the accumulating memory, the maximum value detector configured to select a maximum value of the set of accumulated values as the data bit edge.

21. A mobile station for detecting a bit edge from a stream of meander encoded data samples, the mobile station comprising:
  a first memory and a second memory configured to receive meander encoded data samples, wherein possible bit edge phases are defined from the meander encoded data samples and each of the possible bit edge phases corresponds to a possible bit edge phase;
  a toggle unit disposed anteriorly to the second memory, wherein the toggle unit toggles a subset of the meander encoded data samples;
  an integrator coupled to the first memory and the second memory, the integrator configured to integrate the toggled subset of the meander encoded data samples with an un-toggled subset of the meander encoded data samples to produce an accumulated value corresponding to the possible bit edge phase;
  an accumulating memory coupled to the integrator, the accumulator configured to compute a set of accumulated values for a corresponding set of the possible bit edge phases; and
  a maximum value detector coupled to the accumulating memory, the maximum value detector configured to select a maximum value of the set of accumulated values as the data bit edge.

22. A device for detecting a bit edge from a stream of meander encoded data samples, the device comprising a processing unit and a memory wherein the memory includes software instructions executable by the processing unit to:
  receive meander encoded data samples;
  compute a set of accumulated values for a corresponding set of possible bit edge phases, each of the possible bit edge phases corresponds to a possible bit edge phase, wherein the software instruction to compute each accumulated value of the set of accumulated values comprises software instructions to:
provide a toggled subset of the meander encoded data sample; and
integrate the toggled subset of the meander encoded data samples with an un-toggled subset of the meander encoded data samples to produce the accumulated value; and
select a maximum value of the set of accumulated values as the data bit edge.

23. The device of claim 22, wherein the software instructions to provide the toggled subset of the meander encoded data samples comprises software instructions to change a sign of a data sample of the meander encoded data samples.

24. The device of claim 22, wherein the software instructions to provide the toggled subset of the meander encoded data sample comprises software instructions to provide 10 toggled data samples from the meander encoded data samples.

25. The device of claim 22, further comprising software instructions to repeat the software instructions to compute the set of accumulated values, wherein each accumulated value comprises a sum of accumulated values having a common bit edge phase.

26. The device of claim 22, wherein the software instructions to select the maximum value of the set of accumulated values comprises software instructions to:
search for the maximum value; and
compare the maximum value to a first threshold ($Th_1$).

27. The device of claim 22, wherein the software instructions to select the maximum value of the set of accumulated values comprises software instructions to:
search for the maximum value;
find a next largest value; and
compare a ratio between the maximum value and the next largest value to a second threshold ($Th_2$).

28. The device of claim 22, wherein the software instructions to select the maximum value of the set of accumulated values comprises software instructions to:
search for the maximum value;
find a local maximum value; and
compare a ratio between the maximum value and the local maximum value to a third threshold ($Th_3$).

29. A computer-readable medium including program code stored thereon, the program code executable by a processing unit for detecting a bit edge from a stream of meander encoded data samples and comprising program code to:
receive meander encoded data samples;
compute a set of accumulated values for a corresponding set of bit edge phases, wherein the program code to compute each accumulated value of the set of accumulated values comprises program code to:
provide a toggled subset of the meander encoded data sample; and
integrate the toggled subset of the meander encoded data samples with an un-toggled subset of the meander encoded data samples to produce the accumulated value; and
select a maximum value of the set of accumulated values as the data bit edge.

30. The computer-readable medium of claim 29, wherein the program code to provide the toggled subset of the meander encoded data samples comprises program code to change a sign of a sample of the meander encoded data samples.

31. The computer-readable medium of claim 29, wherein the program code to provide the toggled subset of the meander encoded data sample comprises program code to provide 10 toggled samples from the meander encoded data samples.

32. The computer-readable medium of claim 29, further comprising program code to repeat the program code to compute the set of accumulated values, wherein each accumulated value comprises a sum of accumulated values having a common bit edge phase.

33. The computer-readable medium of claim 29, wherein the program code to select the maximum value of the set of accumulated values comprises program code to:
search for the maximum value; and
compare the maximum value to a first threshold ($Th_1$).

34. The computer-readable medium of claim 29, wherein the program code to select the maximum value of the set of accumulated values comprises program code to:
search for the maximum value;
find a next largest value; and
compare a ratio between the maximum value and the next largest value to a second threshold ($Th_2$).

35. The computer-readable medium of claim 29, wherein the program code to select the maximum value of the set of accumulated values comprises program code to:
search for the maximum value;
find a local maximum value; and
compare a ratio between the maximum value and the local maximum value to a third threshold ($Th_3$).

* * * * *